(12) United States Patent
Schaffert

(10) Patent No.: US 9,736,978 B2
(45) Date of Patent: Aug. 22, 2017

(54) SUPPORTING DEVICE FOR A SEED FOLLOWER

(71) Applicant: SCHAFFERT MANUFACTURING COMPANY, Indianola, NE (US)

(72) Inventor: Paul E. Schaffert, Indianola, NE (US)

(73) Assignee: Schaffert Manufacturing Company, Inc., Indianola, NE (US)

( * ) Notice: Subject to any disclaimer, the term of this patent is extended or adjusted under 35 U.S.C. 154(b) by 253 days.

(21) Appl. No.: 14/163,241

(22) Filed: Jan. 24, 2014

(65) Prior Publication Data

US 2014/0209001 A1 Jul. 31, 2014

Related U.S. Application Data

(60) Provisional application No. 61/756,985, filed on Jan. 25, 2013.

(51) Int. Cl.
*A01C 7/20* (2006.01)
*A01C 5/06* (2006.01)
*A01C 7/06* (2006.01)

(52) U.S. Cl.
CPC ............... *A01C 7/201* (2013.01); *A01C 5/06* (2013.01); *A01C 5/068* (2013.01); *A01C 7/06* (2013.01);
(Continued)

(58) Field of Classification Search
USPC ................................................ 111/150, 189
See application file for complete search history.

(56) References Cited

U.S. PATENT DOCUMENTS

| 13,683 | A | 10/1855 | McCormick |
| 35,510 | A | 6/1862 | De Haven |

(Continued)

FOREIGN PATENT DOCUMENTS

| DE | 3114771 | 10/1982 |
| DE | 3321490 | 12/1984 |

(Continued)

OTHER PUBLICATIONS

Author Unknown, "1200 Series Advanced Seed Meter Planters", Case III, CNH America, LLC 2005, 1-35.
(Continued)

*Primary Examiner* — Alicia Torres
(74) *Attorney, Agent, or Firm* — Dorsey & Whitney LLP

(57) ABSTRACT

A supporting device for supporting a furrow device and/or for connecting the same to a seed tube of a seed planting unit is described. The supporting device may include a connection element and an alignment element joined to the connection element. The connection element may include a connection feature and a stand feature. The connection feature may be configured to attach the furrow device to the supporting device. The stand feature may be configured to position the furrow device at a desired angle relative to the furrow. The alignment element may include an alignment feature and a positioning feature. The alignment feature may be configured to axially align a longitudinal axis of the supporting device with a longitudinal axis of the seed tube. The positioning feature may be configured to position the furrow device at a desired location along a longitudinal dimension of the seed tube.

22 Claims, 16 Drawing Sheets

(52) U.S. Cl.
CPC .... *Y10T 29/49817* (2015.01); *Y10T 29/49826* (2015.01); *Y10T 29/49947* (2015.01)

(56) References Cited

U.S. PATENT DOCUMENTS

| | | | |
|---|---|---|---|
| 122,299 A | 12/1871 | Wight et al. | |
| 176,708 A | 4/1876 | Templin | |
| 183,947 A | 10/1876 | Lewis | |
| 203,207 A | 4/1878 | Springer | |
| 211,601 A | 1/1879 | Springer | |
| 221,004 A * | 10/1879 | Strayer | A01C 5/06 111/150 |
| 252,265 A | 1/1882 | Scofield | |
| 288,661 A | 11/1883 | Purdy et al. | |
| 308,327 A | 11/1884 | Runstetler | |
| 322,841 A | 7/1885 | Miskimen | |
| 410,438 A | 9/1889 | Patric et al. | |
| 555,897 A | 3/1896 | Crane | |
| 789,798 A | 5/1905 | Deterding | |
| 889,947 A | 6/1908 | Miller | |
| 909,137 A | 1/1909 | Bellerive | |
| 1,104,602 A | 7/1914 | Akers | |
| 1,473,297 A | 11/1923 | Knight | |
| 1,691,466 A | 11/1928 | Burtner | |
| 1,934,490 A | 11/1933 | Elliott | |
| 2,096,230 A | 10/1937 | Elliott | |
| 2,533,374 A | 12/1950 | Hyland | |
| 2,554,205 A | 5/1951 | Oehler | |
| 2,753,054 A | 7/1956 | Becher | |
| 2,849,969 A | 9/1958 | Taylor | |
| 2,872,883 A | 2/1959 | Padrick | |
| 3,182,345 A | 5/1965 | Smith | |
| 3,185,837 A | 5/1965 | Stern | |
| 3,336,885 A | 8/1967 | Lebow | |
| 4,108,089 A | 8/1978 | van der Lely | |
| 4,148,267 A | 4/1979 | Bennett et al. | |
| 4,253,412 A | 3/1981 | Hogenson | |
| 4,276,836 A | 7/1981 | Pust | |
| 4,373,455 A | 2/1983 | Friggstad | |
| 4,420,516 A | 12/1983 | Ermert et al. | |
| 4,445,445 A | 5/1984 | Sterrett | |
| 4,446,801 A | 5/1984 | Machnee et al. | |
| 4,542,705 A | 9/1985 | Orth | |
| 4,565,141 A | 1/1986 | Kopecky | |
| 4,580,507 A | 4/1986 | Dreyer et al. | |
| D285,205 S | 8/1986 | Johnson | |
| 4,607,581 A | 8/1986 | Kopecky | |
| 4,628,841 A | 12/1986 | Powilleit | |
| 4,671,193 A | 6/1987 | States | |
| 4,674,419 A | 6/1987 | Kopecky | |
| 4,779,674 A | 10/1988 | McNulty | |
| 4,911,090 A | 3/1990 | Schimke | |
| 5,092,255 A * | 3/1992 | Long | A01C 5/064 111/167 |
| 5,375,542 A | 12/1994 | Schaffert | |
| 5,425,318 A | 6/1995 | Keeton | |
| D376,751 S | 12/1996 | Hanson | |
| 5,640,915 A | 6/1997 | Schaffert | |
| 5,673,638 A * | 10/1997 | Keeton | A01C 5/066 111/167 |
| 5,730,074 A | 3/1998 | Peter | |
| 5,852,982 A | 12/1998 | Peter | |
| 5,918,557 A | 7/1999 | Schaffert | |
| 5,996,514 A | 12/1999 | Arriola et al. | |
| D422,483 S | 4/2000 | Shea | |
| 6,067,917 A | 5/2000 | Nimberger et al. | |
| D426,453 S * | 6/2000 | Stearns | D8/354 |
| 6,082,274 A | 7/2000 | Peter | |
| 6,082,275 A | 7/2000 | Schaffert | |
| 6,119,608 A | 9/2000 | Peterson et al. | |
| D436,310 S | 1/2001 | Arnold | |
| 6,209,466 B1 | 4/2001 | Wodrich | |
| 6,220,191 B1 | 4/2001 | Peter | |
| 6,283,050 B1 | 9/2001 | Schaffert | |
| D456,821 S | 5/2002 | Ege | |
| 6,397,767 B1 | 6/2002 | Dietrich, Sr. | |
| D463,251 S | 9/2002 | Shea | |
| 6,453,832 B1 | 9/2002 | Schaffert | |
| 6,530,334 B2 | 3/2003 | Hagny | |
| 6,666,156 B1 * | 12/2003 | Mayerle | A01C 5/064 111/150 |
| 6,763,773 B2 | 7/2004 | Schaffert | |
| 7,121,216 B2 | 10/2006 | Schaffert | |
| D557,116 S | 12/2007 | Zakowski | |
| 7,497,174 B2 * | 3/2009 | Sauder | A01C 5/068 111/121 |
| D591,776 S | 5/2009 | Rasset | |
| 7,552,689 B2 | 6/2009 | Schaffert | |
| 7,942,102 B2 | 5/2011 | Schaffert | |
| D661,713 S | 6/2012 | Marchesan | |
| D735,770 S * | 8/2015 | Schaffert | D15/28 |
| 2002/0195033 A1 * | 12/2002 | Schaffert | A01C 5/06 111/189 |
| 2003/0051650 A1 | 3/2003 | Engelke et al. | |
| 2007/0113763 A1 | 5/2007 | Schaffert | |
| 2009/0084295 A1 | 4/2009 | Schaffert | |
| 2010/0212558 A1 | 8/2010 | Schaffert | |
| 2011/0266013 A1 * | 11/2011 | Ryan | A01B 15/00 172/719 |
| 2014/0238285 A1 | 8/2014 | Schaffert | |

FOREIGN PATENT DOCUMENTS

| | | |
|---|---|---|
| DE | 3441610 | 5/1986 |
| GB | 320179 | 10/1929 |

OTHER PUBLICATIONS

Author Unknown, "Cost-Effective Solutions for Real-World Needs", Yetter Profitable Solutions, at least as early as Dec. 21, 2007, 1-29.
Author Unknown, "http://precision_planting.com/html/keeton.html", at least as early as Dec. 30, 2000, 1 page.
Author Unknown, "Keeton Seed Firmer", J & K Enterprises, 1994, 2 pages.
Author Unknown, "Keeton Seed Firmer, Precision Planting", at least as early as Apr. 9, 2001, 4 pages.
Author Unknown, "Seed to Soil Inforcer", Seed Flap, Spring 1995, 1 page.
Author Unknown, "Tube Alignment Brackets", M & J Cotton Farms, Inc., at least as early as Oct. 30, 1995, 1 page.
Author Unknown, "We Know Its All About Strong Roots", Yetter Profitable Solutions, at least as early as Dec. 21, 2007, Dec 21, 2007, 1-29.
Finck, Charlene, "Put Seed in Its Place", Farm Journal, Jan. 1995, 16-17.
US Advisory Action dated Oct. 21, 2010 for U.S. Appl. No. 12/493,703, 3 pages.
US Amendment and Response dated Oct. 11, 1996 for U.S. Appl. No. 08/550,088, 13 pages.
US Amendment and Response and Terminal Disclaimer to Non-Final Office Action dated Oct. 15, 1998 for U.S. Appl. No. 08/881,177, 13 pages.
US Amendment and Response and Two Terminal Disclaimers to Non-Final Office Action dated Jun. 10, 1998 for U.S. Appl. No. 08/881,176, 15 pages.
US Amendment and Response to Final Office Action dated Apr. 6, 2001 for U.S. Appl. No. 09/563,106, 5 pages.
US Amendment and Response to Final Office Action dated Jun. 21, 2006 for U.S. Appl. No. 10/819,565, 5 pages.
US Amendment and Response to Final Office Action dated Oct. 15, 2010 for U.S. Appl. No. 12/493,703, 5 pages.
US Amendment and Response to Final Office Action dated Sep. 29, 2011 for U.S. Appl. No. 12/773,645, 8 pages.
US Amendment and Response to Non-Final Office Action dated Jun. 30, 1999 for U.S. Appl. No. 08/881,177, 13 pages.
US Amendment and Response to Non-Final Office Action dated Nov. 17, 2003 for U.S. Appl. No. 10/228,688, 13 pages.

(56) References Cited

OTHER PUBLICATIONS

US Amendment and Response to Non-Final Office Action dated Nov. 2, 2009 for U.S. Appl. No. 11/862,477, 13 pages.
US Amendment and Response to Non-Final Office Action dated Jun. 29, 1998 for U.S. Appl. No. 08/881,177, 20 pages.
US Amendment and Response to Non-Final Office Action dated Dec. 18, 2000 for U.S. Appl. No. 09/563,106, 4 pages.
US Amendment and Response to Non-Final Office Action dated Jul. 2, 2010 for U.S. Appl. No. 12/493,703, 6 pages.
US Amendment and Response to Non-Final Office Action dated Apr. 9, 2012 for U.S. Appl. No. 12/773,64, 7 pages.
US Amendment and Response to Non-Final Office Action dated Oct. 13, 2008 for U.S. Appl. No. 11/169,050, 7 pages.
US Amendment and Response to Non-Final Office Action dated Nov. 24, 1999 for U.S. Appl. No. 08/881,177, 8 pages.
US Amendment and Response to Non-Final Office Action dated Dec. 21, 2005 for U.S. Appl. No. 10/819,565, 9 pages.
US Amendment and Response to Notice of Non-Compliant Response to Restriction Requirement dated May 13, 2008 for U.S. Appl. No. 11/169,050, 7 pages.
US Amendment and Response to Restriction Requirement dated Jun. 10, 2009 for U.S. Appl. No. 11/862,477, 10 pages.
US Amendment and Response to Restriction Requirement dated Dec. 20, 2007 for U.S. Appl. No. 11/169,050, 6 pages.
US Applicant-Initiated Interview Summary dated Apr. 5, 2012 for U.S. Appl. No. 12/773,645, 3 pages.
US Decision Approving Terminal Disclaimer dated Nov. 5, 2010 for U.S. Appl. No. 12/493,703, 1 page.
US Final Office Action dated Jan. 10, 2001 for U.S. Appl. No. 09/563,106, 5 pages.
US Final Office Action dated Mar. 23, 2006 for U.S. Appl. No. 10/819,565, 5 pages.
US Final Office Action dated Jul. 16, 2010 for U.S. Appl. No. 12/493,703, 6 pages.
US Final Office Action dated Jun. 29, 2011 for U.S. Appl. No. 12/773,645, 8 pages.
US Non-Final Office Action dated Jan. 5, 1999 for U.S. Appl. No. 08/881,177, 10 pages.
US Non-Final Office Action dated Jul. 1, 2009 for U.S. Appl. No. 11/862,477, 10 pages.
US Non-Final Office Action dated Jul. 16, 2003 for U.S. Appl. No. 10/228,688, 10 pages.
US Non-Final Office Action dated Aug. 30, 2007 for U.S. Appl. No. 11/582,154, 11 pages.
US Non-Final Office Action dated Feb. 10, 1998 for U.S. Appl. No. 08/881,176, 11 pages.
US Non-Final Office Action dated Jul. 15, 1998 for U.S. Appl. No. 08/881,177, 11 pages.
US Non-Final Office Action dated Jan. 28, 1998 for U.S. Appl. No. 08/881,177, 13 pages.
US Non-Final Office Action dated Feb. 27, 2012 for U.S. Appl. No. 13/109,147, 14 pages.
US Non-Final Office Action dated Oct. 19, 2005 for U.S. Appl. No. 10/819,565, 20 pages.
US Non-Final Office Action dated Jul. 11, 2008 for U.S. Appl. No. 11/169,050, 6 pages.
US Non-Final Office Action dated Jun. 11, 1996 for U.S. Appl. No. 08/550,088, 6 pages.
US Non-Final Office Action dated Dec. 9, 2011 for U.S. Appl. No. 12/773,645, 7 pages.
US Non-Final Office Action dated Mar. 2, 2010 for U.S. Appl. No. 12/493,703, 7 pages.
US Non-Final Office Action dated Sep. 18, 2000 for U.S. Appl. No. 09/563,106, 7 pages.
US Non-Final Office Action dated Feb. 7, 2011 for U.S. Appl. No. 12/773,645, 8 pages.
US Non-Final Office Action dated Jul. 27, 1999 for U.S. Appl. No. 08/881,177, 9 pages.
US Notice of Allowance dated Apr. 18, 2001 for U.S. Appl. No. 09/563,106, 2 pages.
US Notice of Allowance dated Jan. 21, 1999 for U.S. Appl. No. 08/881,176, 3 pages.
US Notice of Allowance dated Dec. 15, 2009 for U.S. Appl. No. 11/862,477, 4 pages.
US Notice of Allowance dated Feb. 25, 2009 for U.S. Appl. No. 11/169,050, 4 pages.
US Notice of Allowance dated Jun. 30, 2006 for U.S. Appl. No. 10/819,565, 4 pages.
US Notice of Allowance dated Nov. 17, 2008 for U.S. Appl. No. 11/169,050, 4 pages.
US Notice of Allowance dated Sep. 29, 1998 for U.S. Appl. No. 08/881,176, 4 pages.
US Notice of Allowance dated Apr. 23, 2012 for U.S. Appl. No. 12/773,645, 5 pages.
US Notice of Allowance dated Dec. 12, 2003 for U.S. Appl. No. 10/228,688, 6 pages.
US Notice of Allowance dated May 7, 2002 for U.S. Appl. No. 09/832,740, 6 pages.
US Notice of Allowance dated Dec. 9, 1996 for U.S. Appl. No. 08/550,088, 7 pages.
US Notice of Allowance dated Dec. 20, 1999 for U.S. Appl. No. 08/881,177, 8 pages.
US Notice of Allowance and Interview Summary dated Dec. 29, 2010 for U.S. Appl. No. 12/493,703, 6 pages.
US Notice of Non-Compliant Response to Restriction Requirement dated Feb. 13, 2008 for U.S. Appl. No. 11/169,050, 3 pages.
US Notice to File Corrected Application Papers dated Feb. 18, 2011 for U.S. Appl. No. 12/493,703, 3 pages.
US Preliminary Amendment dated Jun. 23, 1997 for U.S. Appl. No. 08/881,176, 4 pages.
US Preliminary Amendment dated May 2, 2000 for U.S. Appl. No. 09/563,106, 4 pages.
US Request for Continue Examination dated Sep. 29, 2011 for U.S. Appl. No. 12/773,645, 1 page.
US Response and Terminal Disclaimer to Non-Final Office Action dated May 9, 2011 for U.S. Appl. No. 12/773,645, 5 pages.
US Response to Notice to File Corrected Application Papers dated Mar. 15, 2011 for U.S. Appl. No. 12/493,703, 5 pages.
US Response to Restriction Requirement dated Nov. 23, 2011 for U.S. Appl. No. 12/773,645, 8 pages.
US Response to Rule 312 Communication dated Mar. 23, 2011 for U.S. Appl. No. 12/493,703, 2 pages.
US Restriction Requirement dated Oct. 29, 2010 for U.S. Appl. No. 12/773,645, 5 pages.
US Restriction Requirement dated Oct. 24, 2011 for U.S. Appl. No. 12/773,645, 6 pages.
US Restriction Requirement dated Nov. 21, 2007 for U.S. Appl. No. 11/169,050, 7 pages.
US Restriction Requirement dated May 1, 2009 for U.S. Appl. No. 11/862,477, 8 pages.
US Supplemental Amendment and Response to Final Office Action dated Oct. 4, 2011 for U.S. Appl. No. 12/773,645, 8 pages.
US Supplemental Notice of Allowability dated Apr. 1, 2011 for U.S. Appl. No. 12/493,703, 2 pages.
US Supplemental Notice of Allowability dated Apr. 1, 2011 for U.S. Appl. No. 12/493,703, 4 pages.
US Supplemental Notice of Allowability dated Apr. 11, 2011 for U.S. Appl. No. 12/493,703, 4 pages.
US Terminal Disclaimer dated May 9, 2011 for U.S. Appl. No. 12/773,645, 1 page.
US Terminal Disclaimer dated Oct. 15, 2010 for U.S. Appl. No. 12/493,703, 1 page.

\* cited by examiner

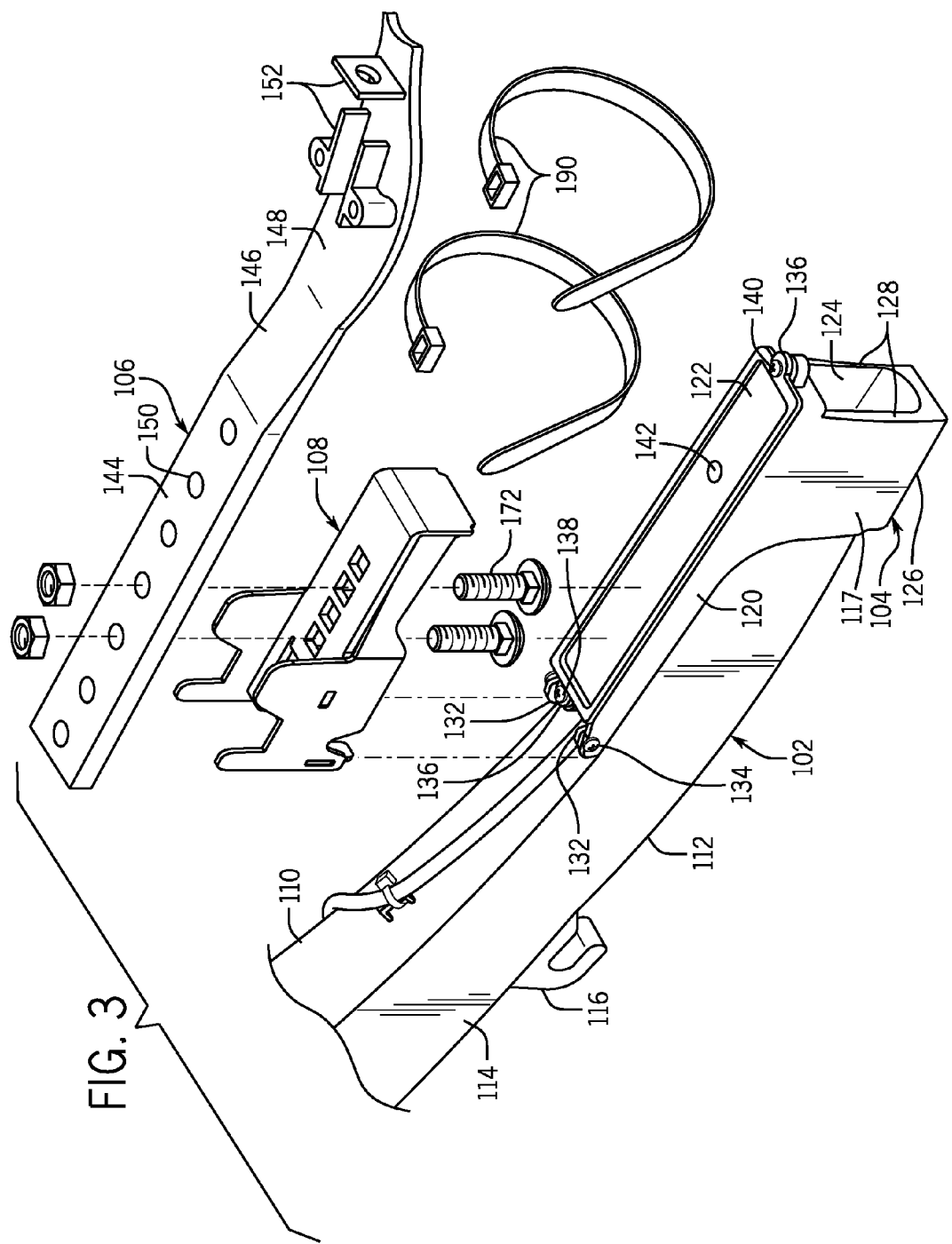

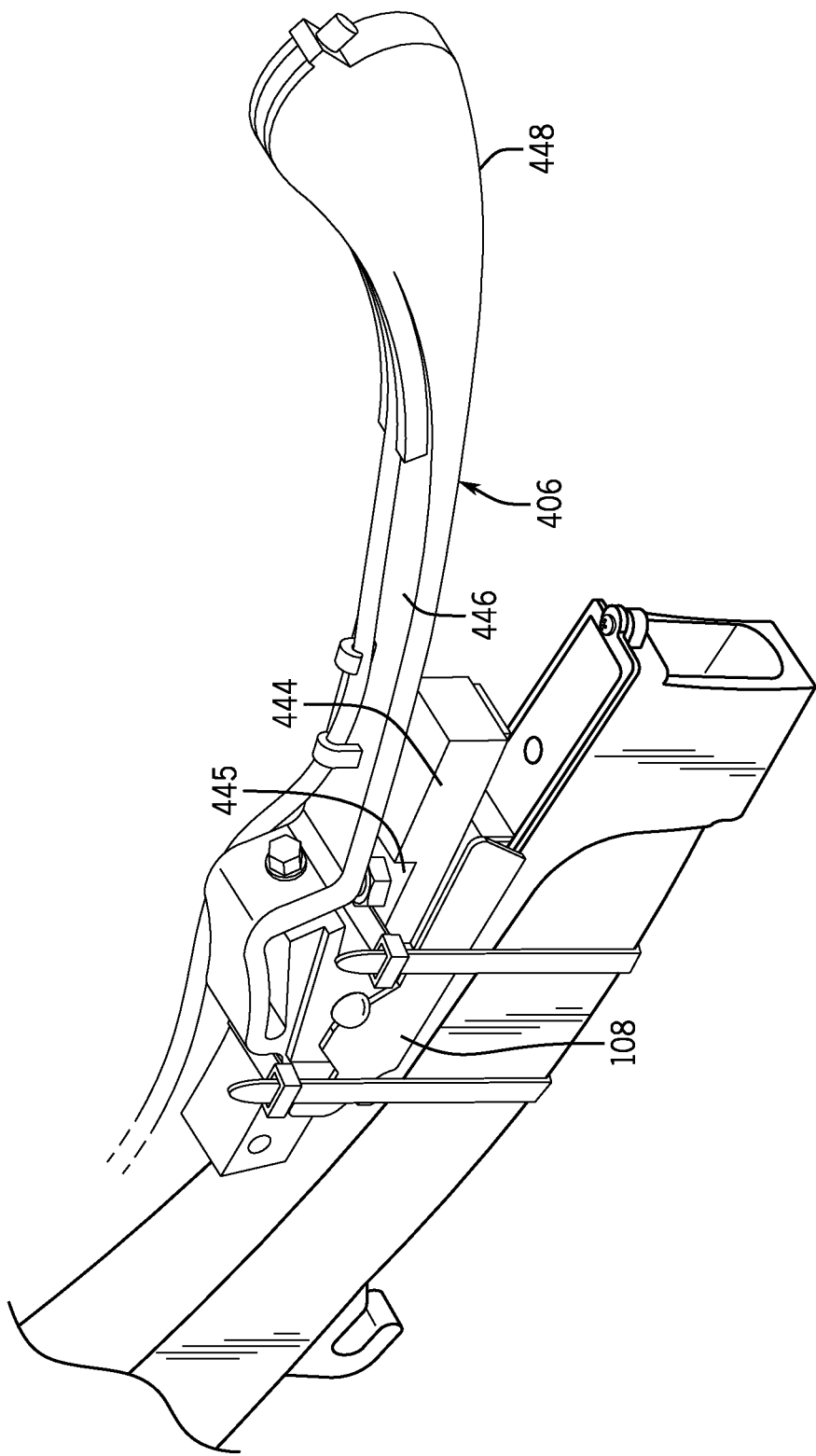

SUPPORTING DEVICE FOR A SEED FOLLOWER

CROSS-REFERENCE TO RELATED APPLICATIONS

This application claims the benefit under 35 U.S.C. §119 (e) of U.S. provisional patent application No. 61/756,985, filed Jan. 25, 2013, and entitled SUPPORTING DEVICE, the entire disclosure of which is hereby incorporated herein by reference.

TECHNOLOGICAL FIELD

The technological field relates to seed planters. More particularly, the present disclosure relates to devices for supporting a planting unit component, such as a furrow device, and/or for connecting the same to a seed tube of a seed planting unit.

BACKGROUND

Seed planters often include several seed planting units transversely arranged relative to a travel direction of the seed planter. Each seed planting unit may include a seed tube for depositing seeds into seed furrows during seed planting. The seed planting unit may also include a furrow device, such as a seed follower for controlling the positions of the seed as they are released from the seed tube. The seed follower may be positioned in an aft position relative to the seed tube and may be attached to the seed tube. The seed unit may be further equipped with a seed sensor assembly for detecting the passage of seeds for accurate planting.

SUMMARY

Described herein are supporting devices for supporting a planting unit component, such as a furrow device, and/or for connecting the same to a seed tube of a seed planting unit, a furrow device assembly including the supporting device, and a seed planting unit including the supporting device. Also described herein are methods for connecting a planting unit component, such as a furrow device, to a seed tube of a seed planting unit.

In one example of a supporting device for operably connecting a furrow device to a seed tube of a planting unit for planting seeds into a furrow, the supporting device may include a connection element and an alignment element joined to the connection element. The connection element may include a connection feature and a stand feature. The connection feature may be configured to attach the furrow device to the supporting device. The stand feature may be configured to position the furrow device at a desired angle relative to the furrow. The alignment element may include an alignment feature and a positioning feature. The alignment feature may be configured to axially align a longitudinal axis of the supporting device with a longitudinal axis of the seed tube. The positioning feature may be configured to position the furrow device at a desired location along a longitudinal dimension of the seed tube.

In some examples, the connection element may include an elongated body.

In some examples, the elongated body may include a plate including a width dimension similar to or substantially the same as a width of the furrow device joined to the supporting device.

In some examples, the connection feature may include at least one aperture formed in the elongated body.

In some examples, the connection element may further include an alignment feature configured to reduce axial shift of the furrow device relative to the seed tube along the longitudinal dimension of the seed tube.

In some examples, the alignment feature of the connection element may include at least one flange-like extension at an upper end of the elongated body. The at least one flange-like extension may abut a portion of a housing of a seed sensor assembly joined to the seed tube.

In some examples, the alignment feature of the connection element may include a recess at an upper end of the elongated body. The recess may abut a portion of a fastener of a seed sensor assembly joined to the seed tube.

In some examples, the alignment feature of the alignment element may include two side walls. Each of the side walls may be positioned along at least a portion of a longitudinal side edge of the connection element.

In some examples, the side walls may extend substantially perpendicularly to the connection element.

In some examples, at least one of the side walls may include at least one of a top sidewall portion or a bottom sidewall portion.

In some examples, the top sidewall portion may include a profiled top edge. At least a portion of the top sidewall portion may extend above a top surface of the furrow device joined to the supporting device.

In some examples, the top sidewall portion may include a securing structure for receiving at least a portion of a securing mechanism. The securing mechanism may secure the furrow device and/or the supporting device to the seed tube.

In some examples, the securing structure may include a recess formed along a top edge of the top sidewall portion.

In some examples, the securing mechanism may include at least one zip tie.

In some examples, the positioning feature may include a recess formed along a bottom edge of the bottom sidewall portion. In some examples, the positioning feature may include a slanted edge portion at a corner of the bottom sidewall portion.

In some examples, the positioning feature may receive and/or engage a portion of a fastener of a seed sensor assembly that is joined to the seed tube.

In some examples, the positioning feature may be positioned axially beyond a recess formed at an upper end of the connection element along a longitudinal dimension of the connection element.

In some examples, the stand feature may include at least one plate or flange-like extension extending downwardly from a bottom surface of the connection element.

In some examples, the stand feature may include a first plate or flange-like extension and a second plate or flange-like extension. The first plate or flange-like extension may extend downwardly from the connection element at a first distance. The second plate or flange-like extension may extend downwardly from the connection element at a second distance. The second distance may be different from the first distance. The first plate or flange-like extension and the second plate or flange-like extension may be spaced apart along the longitudinal axis of the supporting device.

In some examples, the furrow device may include a seed follower.

In some examples, the seed follower may include a connection portion for connecting the seed follower to the supporting device and an engaging portion for controlling seed placement in a furrow.

In some examples, the engaging portion of the seed follower may include a width dimension greater than a width dimension of the connection portion of the seed follower.

In some examples, the engaging portion of the seed follower may include a width dimension less than a width dimension of the connection portion of the seed follower.

In some examples, the engaging portion of the seed follower may include a raised elevation compared to the connection portion of the seed follower.

In one example of a furrow device assembly, the furrow device assembly may include a furrow device and a supporting device for operably connecting the furrow device to a seed tube of a planting unit. The supporting device may include a connection element and an alignment element joined to the connection element. The connection element may include a connection feature and a stand feature. The connection feature may be configured to attach the furrow device to the supporting device. The stand feature may position the furrow device at a desired angle relative to the furrow. The alignment element may include an alignment feature and a positioning feature. The alignment feature may be configured to axially align a longitudinal axis of the supporting device with a longitudinal axis of the seed tube. The positioning feature may be configured to position the furrow device at a desired location along a longitudinal dimension of the seed tube.

In some examples, the furrow device may include a plurality of apertures. The connection feature of the supporting device may include one or more apertures. At least one of the one or more apertures of the connection feature may selectively align with at least one of the plurality of apertures of the furrow device for receiving at least one fastener for attaching the furrow device to the supporting device.

In some examples, the alignment feature of the alignment element may include a pair of side walls. Portions of the side walls and the connection element may define a first bracket for receiving a portion of the furrow device therein. Portions of the side walls and the connection element may define a second bracket for placing over a portion of a seed tube.

In some examples, the second bracket may be placed over a seed sensor assembly attached to the seed tube.

In some examples, the furrow device may include a seed follower.

In one example of a method for connecting a furrow device to a seed tube of a planting unit, the method may include the step of attaching the furrow device to a supporting device so that a portion of the furrow device may be received in a first bracket of the supporting device. The method may also include the step of placing the supporting device on a portion of the seed tube so that a portion of the seed tube may be received within a second bracket of the supporting device. The method may further include the step of securing the furrow device and the supporting device to the seed tube.

In some examples, the step of securing the furrow device and the supporting device to the seed tube may include securing a seed follower and the supporting device to the seed tube using at least one elongated member. The at least one elongated member may preferably include at least one zip tie.

In some examples, the method may also include the step of unsecuring the furrow device from the supporting device.

The method may further include the step of selectively repositioning the furrow device relative to the supporting device along a longitudinal axis of the supporting device. The method may further include the step of re-attaching the furrow device to the supporting device.

This summary of the disclosure is given to aid understanding, and one of skill in the art will understand that each of the various aspects and features of the disclosure may advantageously be used separately in some instances, or in combination with other aspects and features of the disclosure in other instances.

While multiple embodiments are disclosed, still other embodiments of the present disclosure will become apparent to those skilled in the art from the following detailed description, which shows and describes illustrative embodiments of the disclosure. As will be realized, the disclosure is capable of modifications in various aspects, all without departing from the scope of the present disclosure. Accordingly, the drawings and detailed description are to be regarded as illustrative in nature and not restrictive.

BRIEF DESCRIPTION OF THE DRAWINGS

While the specification concludes with claims particularly pointing out and distinctly claiming the subject matter that is regarded as forming the various embodiments of the present disclosure, it is believed that the disclosure will be better understood from the following description taken in conjunction with the accompanying figures, in which:

FIG. 3 is an exploded perspective view of the portion of the planting unit of FIG. 1.

FIG. 8A is a perspective view of a portion of a planting unit similar to that of FIG. 1, incorporating the fourth example of the supporting bracket and a third example of a seed follower.

DESCRIPTION

The present disclosure relates to supporting devices for supporting a planting unit component, such as a furrow device, and/or for connecting the same to a seed tube of a seed planting unit. To aid one in understanding the disclosure, seed followers are described as exemplary furrow devices, which may be supported and connected to a seed tube by the supporting device. It should be understood that the supporting devices as described herein may be used to support and/or connect other types of planting unit components or furrow devices.

The supporting device may include a connection element and an alignment element. The connection element may include a connection feature for adjustably and/or securely attaching a seed follower thereto. The connection element may also include an alignment feature for reducing axial shift of the supporting device and/or the seed follower attached thereto along their longitudinal axes. The connection element may further include a stand feature for positioning the seed follower at a desired angle relative to the seed furrow and/or the seed tube. The alignment element may include an alignment feature for axially aligning the seed follower with the seed tube. The alignment element may also include a positioning feature for positioning the seed follower at a desired location along the seed tube.

Figure 1:
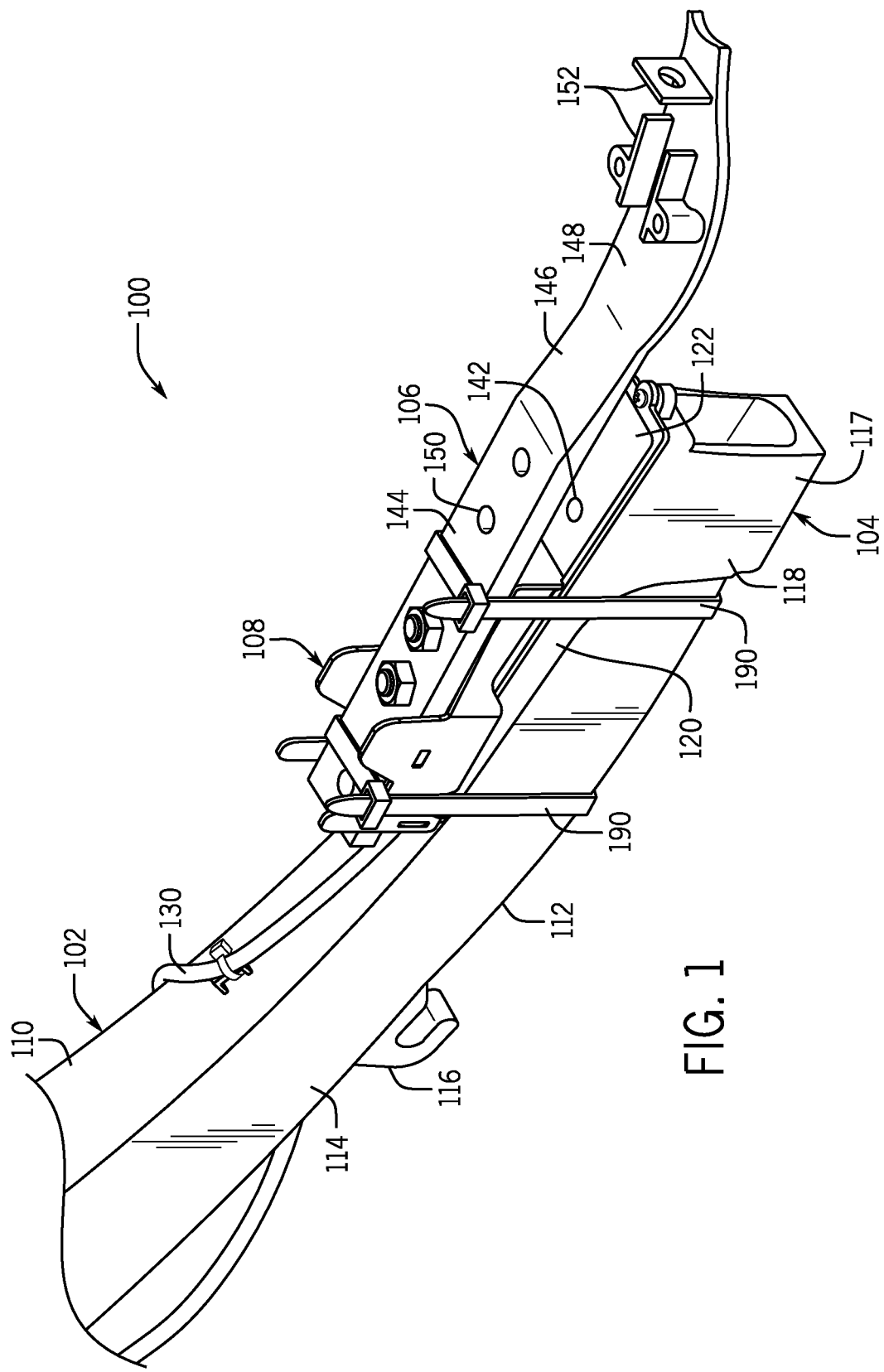
FIG. 1 is a perspective view of a portion of a planting unit for placing seeds into a furrow.
Figure 2:
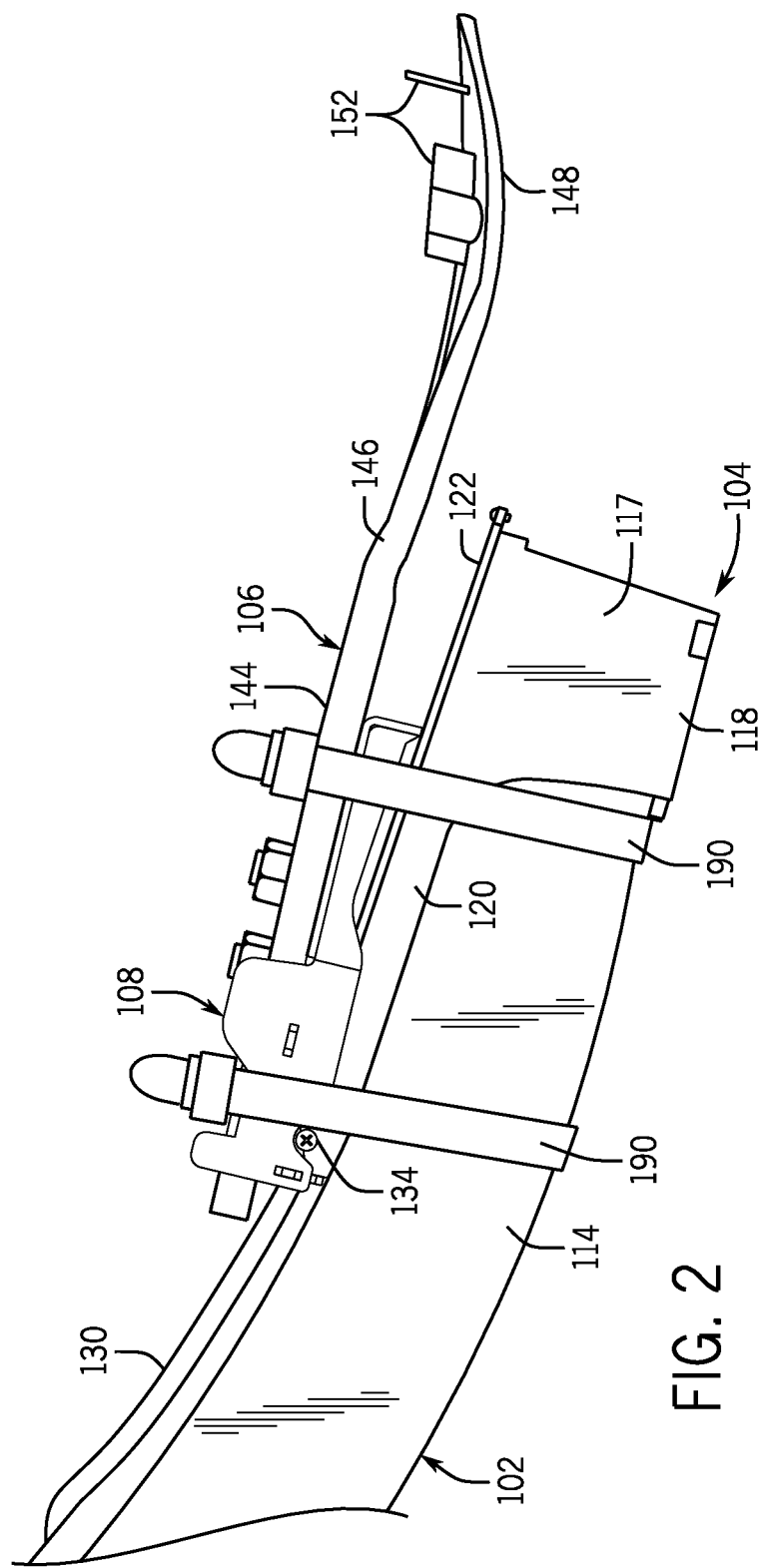
FIG. 2 is a side elevation view of the portion of the planting unit of FIG. 1.

Referring now to FIGS. 1, 2, and 3, a portion of a seed planting unit 100 is shown. The planting unit 100 may include a seed tube 102, through which seeds are released and deposited into a furrow, a seed sensor assembly 104 attached to the lower egress end of the seed tube 102, a furrow device 106, such as a seed follower, and a supporting device 108 for supporting the seed follower 106 on the seed sensor assembly 104. The planting unit 100 may further include structures and components for securing the seed tube 102 to the planting unit 100.

The seed tube 102 may be an elongated and curved tubular body extending generally in a downward and rearward direction relative to the travel direction of the planting unit 100. The seed tube 102 may include a top tube wall 110, a bottom tube wall 112, and two opposing side tube walls 114 collectively defining a seed passageway. The top tube wall 110 may include one or more pairs of protrusions formed along either side edges of the top tube wall 110. Each of the protrusions may include an aperture formed therein. The pairs of protrusions with apertures formed therein may be configured to receive fasteners for securing other planting unit components to the seed tube 102. The bottom tube wall 112 may include a hook 116 for mounting the seed tube 102 to a mounting point of the seed planting unit 100.

The seed sensor assembly 104 may include a sensor arrangement adjacent to the lower egress end of the seed tube 102 for sensing seeds passing therethrough and a sensor housing 117 enclosing the sensor arrangement and attaching the same to the lower egress end of the seed tube 102. The housing 117 may include a housing body 118, an upper leg 120, and an access cover 122. The housing body 118 may include an upper opening, a lower opening 124, a bottom housing wall 126 and two opposing housing side walls 128. The bottom housing wall 126, the two opposing side walls 128, and a lower portion of the access cover 122 may collectively form, in general, an extension of the seed tube 102. Upon exiting the lower egress end of the seed tube 102, the seeds may pass through the housing body 118 by entering the upper opening and exiting the lower opening 124 thereof. The passage of seeds may be sensed by the sensing components of the sensor arrangement contained in the housing body 118.

The upper leg 120 of the housing may be raised over or above the top tube wall 110 and extend forward and upward along the side edges of the top tube wall 110. The upper leg 120 and an upper portion of the access cover 122 may collectively define a space for receiving, for example, the circuitry of the sensor arrangement. Cables or harnesses 130 connected to the sensor arrangement may exit from an upper opening formed by the upper leg 120 and the access cover 122. A recess may be formed at each of the two opposing sides of the upper leg 120 adjacent to the front opening. Each of the recesses may be aligned with an aperture formed in a protrusion 132 extending from the top tube wall 110. A fastener 134 may be received within the recess and pass through the aperture of the protrusion 132 for securing the sensor assembly 104 to the seed tube 102.

The access cover 122 may include ears 136 formed at the upper end and the lower end thereof. Ears may also be formed at corresponding locations of the upper leg 120 and the housing body 118 of the housing. The ears 136 of the access cover 122 and the ears of the housing may be aligned and may receive fasteners 138, 140 for securing the access cover 122 to the housing. The access cover 122 may also include a status indicator 142. The status indicator 142 may be configured as a window for passing through a light signal transmitted from the sensor arrangement inside the housing. The window may be positioned at a lower half of the access cover 122.

In continuing reference to FIGS. 1, 2 and 3, the seed follower 106 may be a seed rebounder. The seed follower 106 may be positioned rearward of the seed tube 102 and may be configured to control the position of seeds in the furrow by, for example, bringing bouncing seeds to rest in the bottom of the furrow, scraping or dislodging seeds from the sides of the furrow and causing them to fall to the bottom of the furrow into a more suitable position, and so on. The seed follower 106 may be a generally elongate and flexible element configured to be positioned behind the seed tube 102 and to flexibly engage the furrow. The seed follower 106 may include a connection portion 144, a neck portion 146, and an engaging portion 148.

The connection portion 144 of the seed follower 106 may be configured for adjustable connection of the seed follower 106 to a supporting device 108. The adjustable connection may allow the depth of the seed follower 106 relative to the furrow to be adjusted thereby providing the farmer with some control over the level of engagement of the seed follower 106 with the furrow. The connection portion 144 may include one or more fastener holes or apertures 150. Alternatively, the connection portion 144 may include slotted holes, a ratchet type connection, a friction type clamp, or other fastening mechanism. Other fastening devices may be provided for the connection portion 144. The one or more fastener holes or apertures 150 may allow for selective alignment of holes or apertures 150 in the seed follower 106 with apertures in a supporting device 108 to control the depth of the seed follower 106. The connection portion 144 may have a width similar to that of the seed tube 102 to allow a snug engagement with a supporting device 108 described below.

The neck portion 146 of the seed follower 106 may be positioned between the connection portion 144 and the engaging portion 148. The neck portion 146 may include a flexibility feature in the form of a reduced thickness, width, or both, providing an increased level of flexibility relative to the connection portion 144, for example. Alternative flexibility features may be provided such as score marks, grooves, or material changes.

The engaging portion 148 may extend from the neck portion 146 and may be shaped and sized to engage the bottom and sides of the furrow. The engaging portion 148 may be somewhat teardrop-shaped so as to gradually engage the furrow along a front side edge and feather out of engagement along a trailing side edge. The trailing side edges of the engaging portion 148 may form an acute angle or V-shape allowing for inclined engagement with the V-shaped furrow. That is, the trailing side edges of the engaging portion 148 may form a tighter V-shape than the furrow due to the inclined engagement of the engaging portion 148 with the furrow. The rear portion of the engaging portion 148 may include a truncating notch allowing seeds in the bottom of the furrow to pass through the notch without unduly being pressed into the bottom of the furrow and further avoiding dragging the seeds along the furrow. The engaging portion 148 may further include irrigation support features 152 for securing liquid fertilization tubes or other items to the seed follower 106.

The seed follower 106 may be made from a resilient material allowing it to repeatedly flexibly engage the furrow. The seed follower 106 may be made from a high density polymer, for example. Other polymer materials or other materials may also be used.

Other types, shapes, and kinds of seed followers 106 may also be provided. In some embodiments, the seed followers described in U.S. Pat. No. 5,640,915, the contents of which are hereby incorporated by reference herein in their entirety, may be provided. In some embodiments, the seed followers described in U.S. Pat. No. 7,942,102, the contents of which are hereby incorporated by reference herein in their entirety, may be provided. Other types of seed followers may also be used such as flaps positioned in the path of the seed to be placed or positioned above the placement location, chains hanging in the path of the seed to be placed or above the placement location, and firming bars for pressing the seed into the bottom of the furrow. Still other types of seed followers may also be used or selected to suitably assist keeping the seeds in the furrow upon being released from the seed tube 102.

With reference again to FIGS. 1, 2, and 3, the seed planting unit 100 may include a supporting device 108 for supporting the seed follower 106 in an aft position relative to the seed tube 102 and the sensor assembly attached thereto. With further reference to FIGS. 4A, 4B, 4C, and 4D, the supporting device 108 may include a first element 154, such as a connection element, and a second element 156, such as an alignment element. In some examples, the supporting device 108 may further include a third element 158, such as a reinforcement element. The connection element 154 may be configured to operably support the seed follower 106 and/or attach the seed follower 106 thereto. The alignment element 156 may be configured to axially align the seed follower 106 with the seed tube 102 along their longitudinal axes. The reinforcement element 158 may be configured to enhance the structural strength of the supporting device 108.

In some examples, the connection element 154 may include an elongated body 159 extending between a first end 160 (e.g. an upper end) and a second end 162 that is distal from the first end 160 (e.g., a lower end) of the supporting device 108. The first end 160 and the second end 162 may delineate a length dimension of the connection element 154. In some examples, the connection element 154 may be configured with a length dimension that may allow the status indicator 142 on the access cover 122 of the seed sensor assembly 104 to be exposed or visible when the supporting device 108 is positioned on the seed tube 102 (see FIG. 1). The elongated body 159 may include a substantially planar first or top surface 164 facing the seed follower 106 attached thereto and a substantially planar second or bottom surface 166 facing the access cover 122 of the sensor assembly 104. As such, the elongated body 159 may take the form of a plate or the like. The plate may include two side edges 168 delineating a width dimension of the connection element 154. In some examples, the width dimension of the connection element 154 may be substantially consistent along its longitudinal dimension. In some examples, the connection element 154 may include a varying width along its longitudinal dimension. In some examples, along at least suitable portions, or the entirety, of its longitudinal axis, the connection element 154 may be configured with a width dimension to be similar to, or substantially the same as, the width dimension of the connection portion 144 of the seed follower 106 and/or the width dimension of the housing and the access cover 122 thereof of the sensor assembly 104. The connection element 154 of the supporting device 108 may axially align with at least a portion of the connection portion 144 of the seed follower 106 and/or at least a portion of the access cover 122 of the sensor assembly 104 along their longitudinal axes when joined together.

Figure 4A:
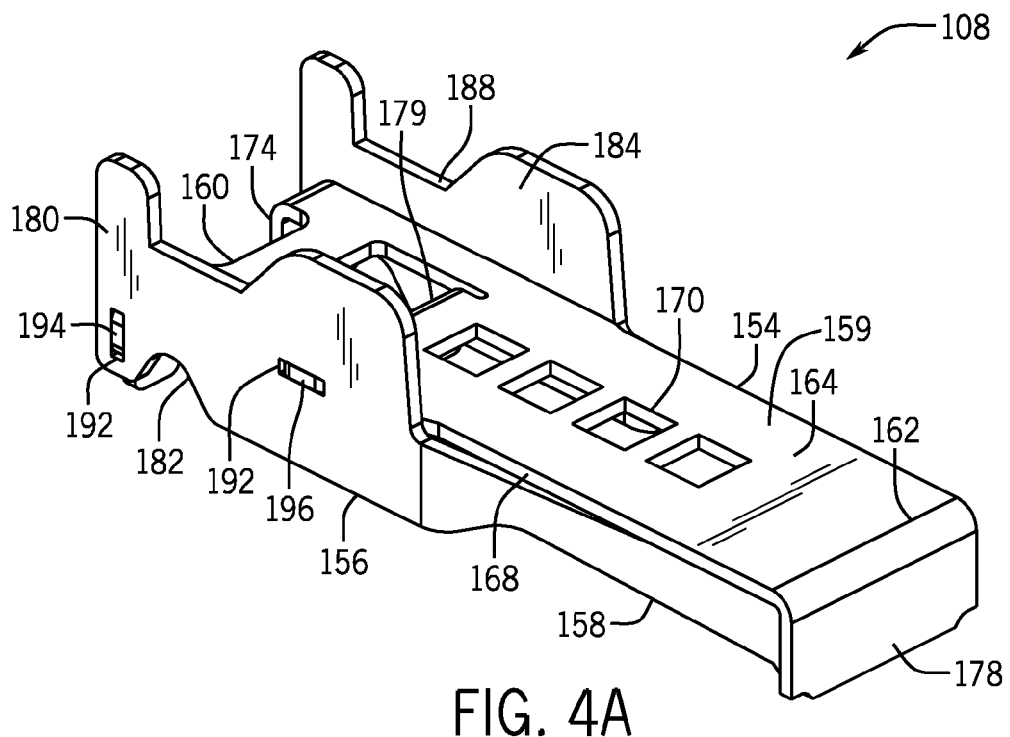
FIG. 4A is a perspective view of the supporting device of the portion of the planting unit of FIG. 1.
Figure 4B:
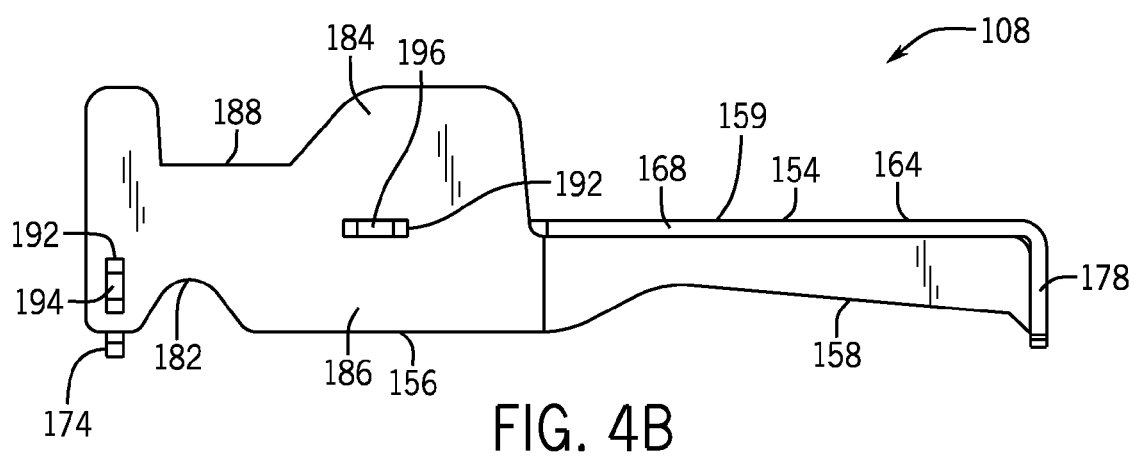
FIG. 4B is a side elevation view of the supporting device of FIG. 4A.
Figure 4C:
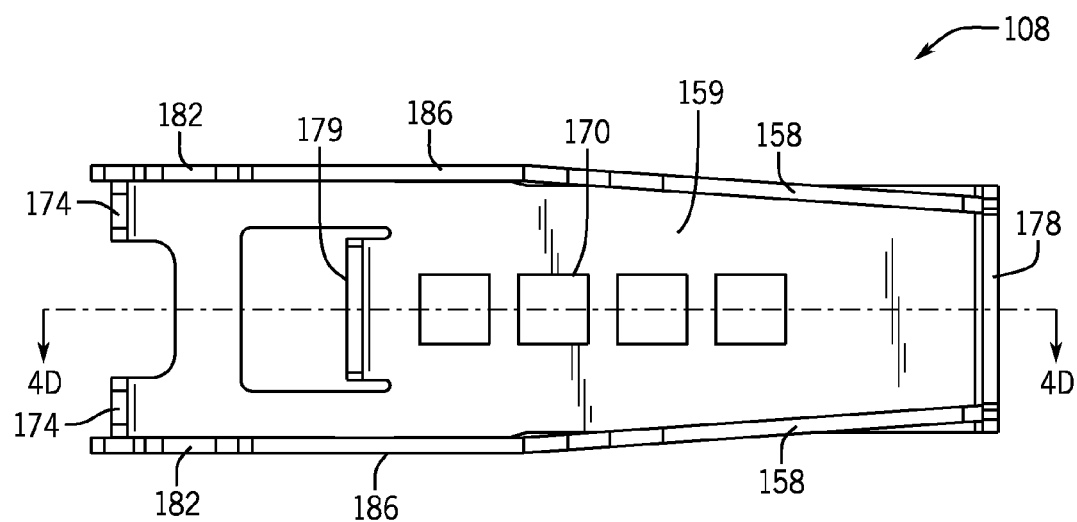
FIG. 4C is a bottom view of the supporting device of FIG. 4A.
Figure 4D:
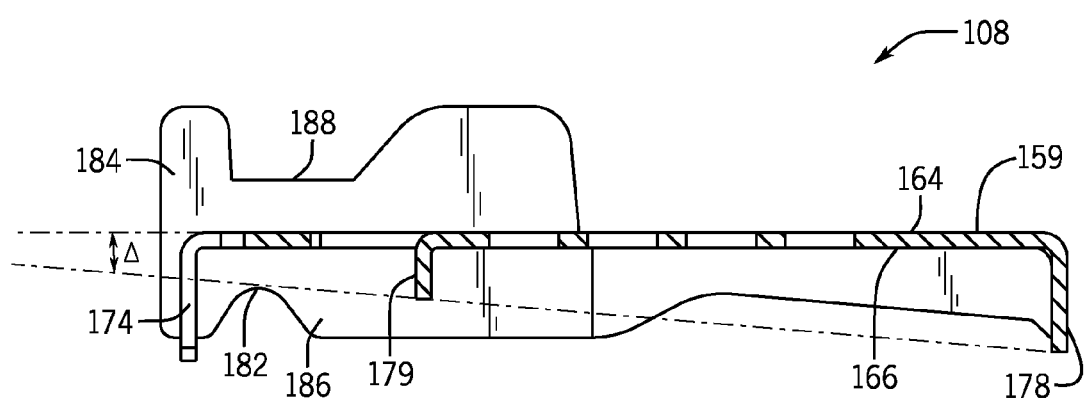
FIG. 4D is a cross sectional view of the supporting device of FIG. 4A, viewed along line 4D-4D of FIG. 4C.
Figure 5A:
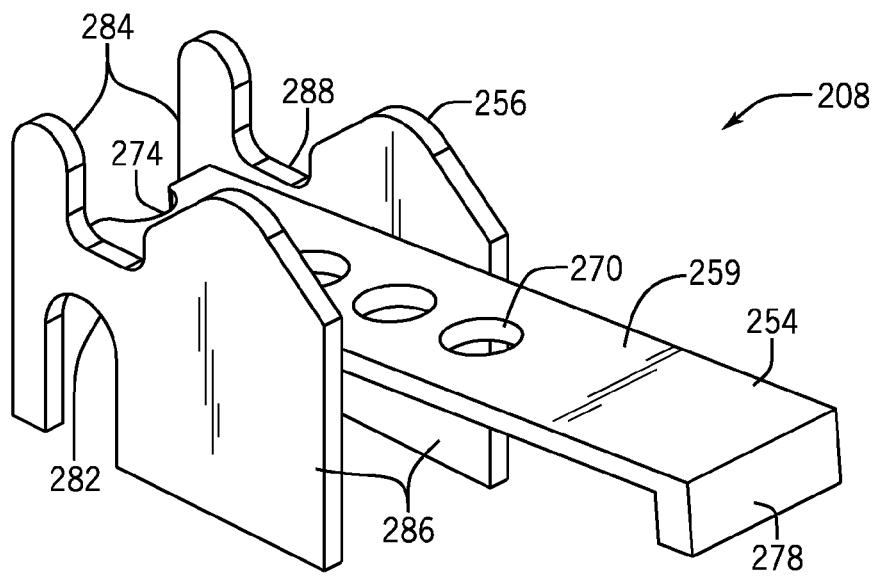
FIG. 5A is a perspective view of a second example of a supporting device, which could be used for the planting unit shown in FIG. 1.
Figure 5B:
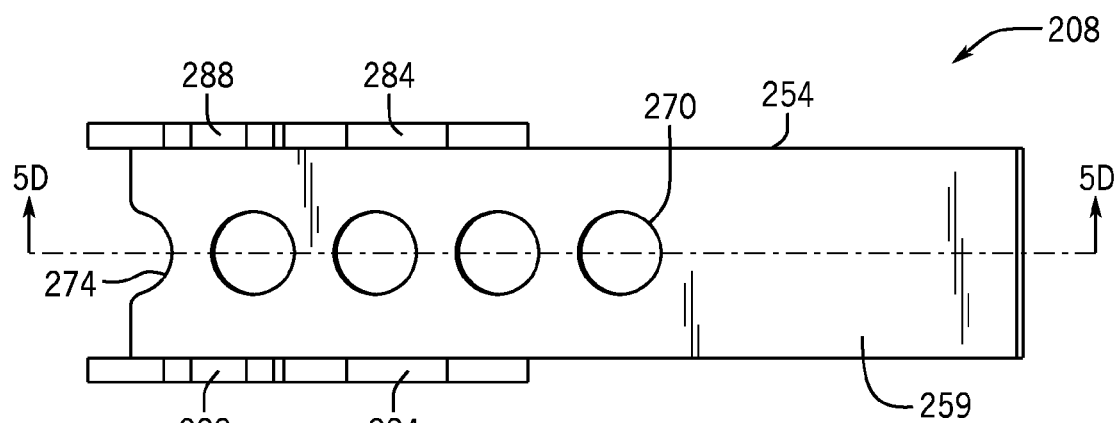
FIG. 5B is a top view of the second supporting device of FIG. 5A.
Figure 5C:
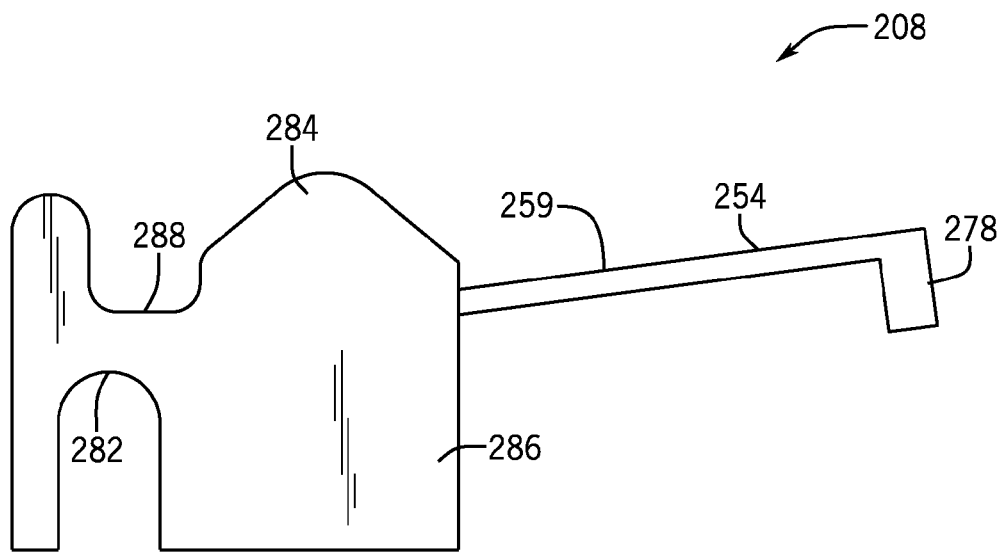
FIG. 5C is a side elevation view of the second supporting device of FIG. 5A.
Figure 5D:
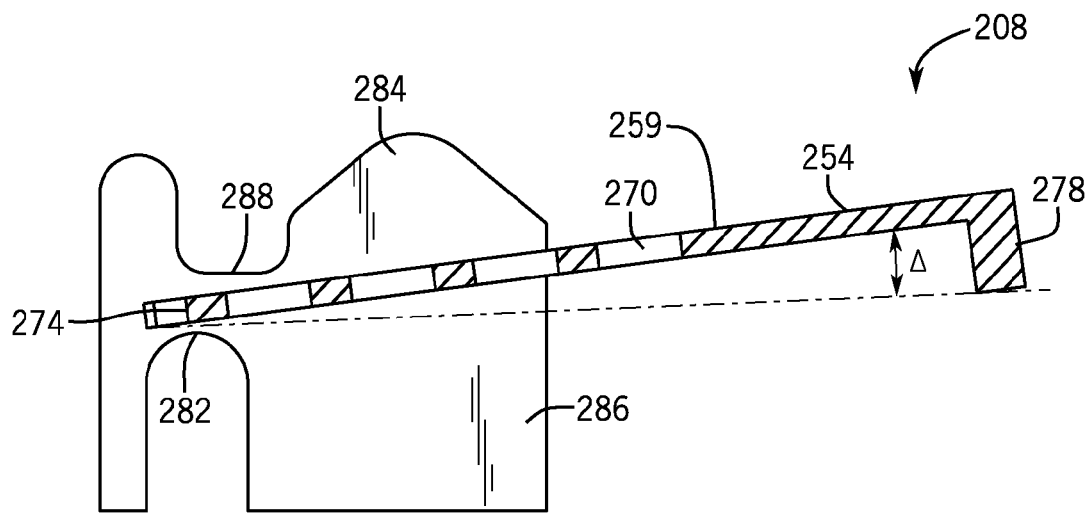
FIG. 5D is a cross sectional view of the second supporting device of FIG. 5A, viewed along line 5D-5D of FIG. 5B.

With reference to FIGS. 4A, 4C, and 4D, the connection element 154 may include a connection feature 170. The connection feature 170 may include one or more apertures formed in the elongated body 159 along the longitudinal dimension thereof. In some examples, the one or more apertures 170 may be formed as separate individual openings. The apertures 170 may be square, circular, triangular, hexagonal, or in any other suitable shape. At least one of the one or more apertures 170 of the connection element 154 may be configured to selectively align with one or more apertures 150 formed in the connection portion 144 of the seed follower 106. Fasteners 172 may be positioned through the aligned apertures 150, 170 for adjustably and/or securely attaching the seed follower 106 to the connection element 154 of the supporting device 108. When joined, a lower surface of the seed follower 106 may abut the top surface 164 of the connection element 154.

The connection element 154 of the supporting device 108 may include four apertures 170 formed therein. The second and the fourth apertures may be configured to align with two adjacent apertures 150 formed in the connection portion 144 of the seed follower 106. Fasteners 172, such as screws, or nuts and bolts, may be positioned through the aligned apertures 150, 170 for securing the seed follower 106 to the connection element 154 of the supporting device 108. In the case where square apertures may be formed in the elongated body 159 of the connection element 154, carriage bolts may be used to join the seed follower 106 to the supporting device 108 such that only one wrench may be needed to tighten or loosen the fasteners 172. In some examples, the centers of the apertures may be spaced apart at a distance of ⅜ inches, or at any other desired distance. As such, the second and the fourth apertures may position two fasteners 172 received therein at a distance of ¾ inches from each other to fit through two adjacent apertures 150 of the seed follower 106.

By selectively aligning one or more of the apertures 150 of the seed follower 106 and one or more of the apertures 170 of the supporting device 108, the position of the engaging portion 148 of the seed follower 106 relative to the seed tube 102 and relative to the furrow may be adjusted to work with different types of soil conditions. Specifically, a first one or a first pair or set of apertures 150 of the seed follower 106 may be selectively aligned with one or more apertures 170 of the supporting device 108 and attached thereto by fasteners 172 for working with a first type of soil. To adjust the seed follower 106 to work with a different type of soil, the seed follower 106 may be detached from the supporting device 108 and selectively repositioned on the supporting device 108 and secured thereto by fasteners 172. To reposition the seed follower 106, either a different one or a different pair or set of apertures 150 of the seed follower 106 and/or one or more different apertures 170 of the supporting device 108 may be selectively aligned with each other to adjust the position of the seed follower 106 relative to the supporting device 108 along the longitudinal axis thereof. As such, the supporting device 108 allows for an adjustable and/or secured attachment of the seed follower 106 to the seed tube 102.

Although the second and the fourth apertures of the supporting device 108 are shown as aligned with two adjacent apertures 150 of the seed follower 106, the first and the third apertures, or any other combination may be selected to align with two adjacent or non-adjacent apertures 150 of the seed follower 106 device depending on the spacing of the apertures 150 of the seed follower 106. In addition, more or less than four apertures 170 may be formed in the connection element 154 of the supporting device 108. The apertures 170 may also be formed with greater or less spacing between each other. The spacing between two adjacent apertures 170 may be constant or may vary. Two fasteners 172 are shown for joining the seed follower 106 to the supporting device 108 so as to reduce lateral and/or rotational shift of the seed follower 106 with respect to the supporting device 108. More or less fasteners 172 may be used.

With reference to FIGS. 4A, 4B, 4C, and 4D, the connection element 154 may include an alignment feature 174 to position the supporting device 108 at a desired location along a longitudinal dimension of the seed tube 102. The alignment feature may include two downward extending tab or flange-like extensions 174 formed adjacent to an upper end 160 of the elongated body 159. Each of the tab or flange-like extensions 174 may be positioned adjacent to a side edge of the elongated body 159. When the supporting device 108 is placed over the seed tube 102, each of the tab or flange-like extensions 174 may abut the upper terminal end 175 of a side wall of the upper leg 120 of the sensor assembly housing (see FIGS. 1, 2 and 3) to reduce upward and/or downward shifting of the supporting device 108 relative to the sensor assembly 104 and/or the seed tube 102. In addition, each of the tab or flange-like extensions 174 and an adjacent sidewall portion (described below) of the supporting device 108 may collectively define a L-shaped bracket for receiving one upper corner of the sensor assembly housing (e.g., the upper terminal end 175 of a side wall of the upper leg 120). The two L-shaped brackets formed by the tab or flange-like extensions 174 and their respective adjacent sidewall portions allow ease of placement and/or installation of the supporting device 108 over an upper portion of the seed sensor assembly 104.

Depending on the desired length of the supporting device 108 and the position of the supporting device 108 relative to the sensor assembly 104, the alignment feature 174 may be positioned at any suitable location between the upper end 160 and the lower end 162 of the elongated body 159. Furthermore, the alignment feature 174 may not be formed adjacent to the side edges 168 of the elongated body 159 to abut the upper terminal ends 175 of the upper leg 120. The alignment feature 174 may be formed along any suitable location along the width dimension of the elongated body 159 to abut other portions of the sensor assembly housing, such as the upper edge 176 of the access cover 122 of the sensor assembly housing, or one or more portions of the seed tube 102, or any suitable features of the sensor assembly 104 or the seed tube 102 that may serve as an anchor for the supporting device 108. Although two tab or flange-like extensions 174 are shown with a space therebetween to allow cables or harnesses 130 of the sensor assembly 104 to pass through, the alignment feature 174 may include one protrusion or more than two protrusions depending on the design of the seed tube 102 and/or the sensor assembly 104.

The alignment feature 174 may be formed by joining one or more downward extending pieces to the bottom surface 166 of the elongated body 159 by welding, gluing, or any suitable connection mechanism. In some examples, the one or more downward extending pieces and the elongated body 159 may be formed as an integral body by casting, molding, forging, bending, or any suitable method. For example, the one or more downward extending pieces may be formed by bending downward a portion of the material piece forming the connection element 154. The portion of the material piece bent down may be an edge portion of the material piece or a non-edge portion partially separated from the surrounding material.

With continued reference to FIGS. 4A, 4B, 4C, and 4D, the connection element 154 may include one or more stand or foot features 178, 179. In some examples, the connection element 154 may include a first stand or foot feature 178 positioned adjacent to the lower end 162 of the connection element 154. The connection element 154 may include a second stand or foot feature 179 positioned between the upper end 160 and the lower end 162 of the connection element 154 at a distance away from the first stand feature 178. The first stand feature 178 may be configured to support the plate portion of the connection element 154 above the access cover 122 of the sensor assembly housing at a first distance. The second stand feature 179 may support the plate portion of the connection element 154 above the access cover 122 at a second distance.

The first distance and the second distance may be determined based on the design of the seed tube 102, the seed sensor 104, the seed follower 106, and/or their connection to the planting unit 100 such that when the various components are joined to the planting unit 100, the seed follower 106 may enter the seed furrow at an angle that facilitates controlling of the positions of the seeds. The first distance may be configured to be greater or less than the second distance such that the connection element 154 of the supporting device 108 may be raised or lowered at its lower end with respect to the access cover 122 of the sensor assembly housing to create a desired angle between the engaging portion 148 of the seed follower 106 relative to the soil surface. In some examples, the supporting device 108 may include only one of the first or second stand features 178, 179 to support the connection element 154 and the seed follower 106 attached thereto at a desired angle. In some examples, the connection element 154 may be formed as a wedge having a varying thickness to allow the seed follower 106 to be positioned at a certain angle relative to the seed tube 102 and/or the furrow. In some examples, the first distance may be the same as the second distance to form a desired angle between the engaging portion 148 of the seed follower 106 and the soil surface. In this case, the connection element 154 of the supporting device 108 and/or the seed follower 106 attached thereto may be parallel to the access cover 122 of the seed sensor housing. In some examples, the supporting device 108 may not include a first or second stand feature 178, 179. The connection portion 144 may simply rest on the access cover 122 of the sensor assembly housing, if desired.

The first stand feature 178 and the second stand feature 179 may be configured to raise or lower the lower end 162 of the connection element 154 of the supporting device 108 such that the connection element 154 and the access cover 122 may form a predetermined angle Δ. In some examples, the angle Δ may range from 2 to 10 degrees. As one example, the lower end 162 of the connection element 154 may be raised by 5 degrees relative to the access cover 122 of the sensor assembly housing such that the engaging portion 148 of the seed follower 106 may enter the seed furrow at an angle of 30 degrees relative to the soil surface to optimize the performance of the seed follower 106. Depending on the specific designs of the seed follower 106, the seed tube 102, the seed sensor assembly 104, and/or the planting unit 100, other angles at which the supporting device 108 may support the seed follower 106, and/or at which the engaging portion 148 of the seed follower 106 may enter the furrow, may be used.

The first and/or the second stand feature 178, 179 may include one or more tabs, plates or flange-like extensions extending downward from the bottom surface 166 of the connection element 154. The first and/or the second stand feature 178, 179 may be formed by joining one or more downward extending pieces to the bottom surface 166 of the elongated body 159 by welding, gluing, or any suitable connection mechanism. In some examples, the one or more downward extending pieces and the elongated body 159 may be formed as an integral body by casting, molding, forging, bending, or any suitable method. For example, the one or more downward extending pieces may be formed by bending downward a portion of the material piece forming the connection element 154. The portion of the material piece bent down may be an edge portion of the material piece (for example, the first stand feature 178) or a non-edge portion partially separated from the surrounding material (for example, the second stand feature 179).

With reference again to FIGS. 4A, 4B, 4C, and 4D, the alignment element 156 of the supporting device 108 may include an alignment feature 180 and a positioning feature 182. The alignment feature 180 may be configured to axially align the supporting device 108 with the seed tube 102 along their respective longitudinal axes. The positioning feature 182 may be configured to position the supporting device 108 at a desired location along a longitudinal dimension of the seed tube 102.

The alignment feature 180 of the alignment element 156 may take the form of a pair of side plates or side walls formed along at least a portion, for example, an upper portion, of each of the side edges 168 of connection element 154 of the supporting device 108. In some examples, the side plates or side walls 180 may be formed along other suitable portions, or the entirety, of the side edges 168 of the connection element 154. The side plates or side walls 180 may extend substantially perpendicularly to the connection element 154. Other extension angles may be implemented depending on the design of the seed follower 106, the sensor assembly 104, and/or the seed tube 102. Each of the pair of side plates or side walls 180 may include a top sidewall portion 184 and a bottom sidewall portion 186. Although the pair of side plates or side walls 180 is shown symmetrical for forming simplicity, the side plates or side walls 180 may not be formed symmetrical to each other to accommodate various design structures of the seed follower 106, the sensor assembly 104 and/or the seed tube 102.

The top sidewall portions 184 extending upward from the top surface 164 of the connection element 154 of the supporting device 108 in combination with the connection element 154 may define in general a bracket for receiving a portion of the connection portion 144 of the seed follower 106. The top sidewall portions 184 may reduce lateral shift of the seed follower 106 when joined to the supporting device 108. The top sidewall portions 184 may extend along any suitable portions, or the entirety of, the side edges 168 of the connection element 154. The top sidewall portions 184 may even extend axially beyond the upper and/or lower ends 160, 162 of the connection element 154. Each of the top sidewall portions 184 may include a profiled top edge. At least a portion of each of the top sidewall portions 184 may extend from the top surface 164 of the connection element 154 at a height greater than the thickness of the connection portion 144 of the seed follower 106. As such, when the seed follower 106 is joined to the supporting device 108, at least a portion of the top sidewall portion 184 may extend above the top surface of the connection portion 144 of the seed follower 106. In some examples, the top edges of the top sidewall portions 184 may not be profiled. As such, the top sidewall portions 184 may extend from the top surface 164 of the connection element 154 at a constant height.

In some examples, each of the top sidewall portions 184 may include at least one securing structure 188 configured to receive a portion of a securing mechanism 190 for securing the supporting device 108 and/or seed follower 106 to the seed tube 102 as described below. In some examples, the at least one securing structure 188 may be a top recess formed at the top edge of the top sidewall portion 184. Other securing structures 188 may be utilized, such as grooves, indentations, trenches, apertures, holes, slots, opening, and so on. The at least one top recess formed at one of the top sidewall portions 184 may be transversely aligned with the at least one top recess formed at the other one of the top sidewall portions 184 relative to the connection element 154. In some examples, the bottom of each top recess may be configured to be lower than the top surface of the seed follower 106 to allow the securing mechanism 190 to rest against the top surface of the seed follower 106 instead of the bottom of each top recess. Such configuration may reduce wear on the securing mechanism 190 that may be caused by the edge portions (such as the bottom of each top recess) of the supporting device 108. It may further reduce any shifting of the seed follower 106 relative to the supporting device 108, the seed sensor assembly 104 and/or the seed tube 102 due to an increased contact surface between the securing mechanism 190 and the seed follower 106. In some examples, the bottom of each top recess may be configured to be higher than the top surface of the seed follower 106 for other considerations.

In some examples, each of the at least one top recesses may be formed at an upper portion of each top sidewall portion 184 along the longitudinal axis of the supporting device 108 such that the top recesses may be positioned at an upper position along the longitudinal axis relative to the apertures 170 of the connection element 154. Such configuration/positioning of the top recesses relative to the apertures 170 of the connection element 154 may reduce interference of the fasteners 172 for joining the seed follower 106 to the supporting device 108 and the securing mechanism 190 for joining the supporting device 108 and the seed follower 106 attached thereto to the seed tube 102. The top recesses may also be formed at a lower position along the longitudinal axis relative to the apertures 170 of the connection element 154. In some examples, multiple securing structures 188, such as multiple top recesses, may be formed at either top sidewall portion 184 for receiving the securing mechanism 190 at multiple positions, including positions transversely overlapping with the aperture 170 positions. Depending on the locations of the fasteners 172 for attaching the seed follower 106, the securing mechanism 190 may be received at select securing structures 188 to reduce the interference. The multiple securing structures 188 may also receive multiple securing mechanisms 190 for secured attachment.

In continuing reference to FIGS. 4A, 4B, 4C, and 4D, the side walls 180 of the supporting device 108 may include bottom sidewall portions 186 extending downward from side edges 168 of the connection element 154. The bottom sidewall portions 186 and the connection element 154 may collectively define in general a bracket for receiving a portion of the housing of the sensor assembly 104, for example, a portion of the upper leg 120 of the housing. In some examples, the bottom sidewall portions 186 may be configured to abut the side walls of the upper leg 120. As such, when the seed follower 106 and the supporting device 108 are positioned over the sensor assembly housing and the seed tube 102, the bottom sidewall portions 186 may facilitate axially aligning the seed follower 106 with the seed tube 102 and reduce lateral shift of the seed follower 106 relative to the seed tube 102. In some examples, the bottom sidewall portions 186 may be spaced apart by the connection element 154 at a distance slightly greater than the width of the upper leg 120 of the seed sensor assembly housing to provide some tolerance for easy installation of the supporting device 108 on the sensor assembly housing. As such, the portion of the connection element 154 joined to the inner surfaces of the side walls 180, for example, the upper portion 160 of the connection element 154, may include a width slighter greater than the portion of the connection element 154 that is not joined to the inner surfaces of the side walls 180, for example, the lower portion 162 of the connection element 154 (see FIGS. 4A and 4C). In some examples, the lower portion 162 of the connection element 154 may be configured with a width dimension slightly less than that of the upper portion 160 to minimize contact of the supporting device 108 and/or the securing mechanisms 190 attached thereto (described below) by adjacent furrow disks.

With further reference to FIGS. 4A, 4B, 4C, and 4D, the alignment element 156 may further include a positioning feature 182 for positioning the supporting device 108 at a desired location along a longitudinal dimension of the seed tube 102. In some examples, the positioning feature 182 may be a recess or a notch formed at the bottom edge of the bottom sidewall portion 186. The positioning feature 182 is placed over the side fasteners 134 for securing the sensor assembly 104 to the seed tube 102. Other positioning features 182 may be used, such as indentations, grooves, trenches, holes, apertures, slots, openings, and so on. In some examples, the positioning feature 182 may be a domed portion formed at either bottom sidewall portion 186 so as to cover the fasteners 134 that attach the sensor assembly 104 to the seed tube 102.

Although only one positioning feature 182 is shown on either bottom sidewall portion 186, the bottom sidewall portions 186 may include multiple transversely aligned pairs of positioning features 182 for selectively and/or adjustably positioning the supporting device 108 and the seed follower 106 attached thereto onto the sensor assembly 104 and/or the seed tube 102. Depending on the desired placement of the supporting device 108 relative to the seed tube 102 and/or the seed sensor assembly 104, the bottom sidewall portions 186 may be formed along any suitable portion or the entirety of the side edges 168 of the connection element 154. The bottom sidewall portions 186 may even extend axially beyond the upper and/or lower ends 160, 162 of the connection element 154 along the longitudinal axis thereof.

The side walls 180 of the alignment element 156 may be connected to the connection element 154 using any suitable method. In some examples, the side walls 180 may be formed with one or more slots 192. Along side edges 168 of the connection elements 154, protrusions 194, 196 may be formed. By inserting the protrusions 194, 196 of the connection elements 154 into the slots 192 of the side walls 180, the alignment element 156 may be aligned with and connected to the side edges 168 of the connection element 154. Welding, gluing, adhering, or any other suitable connection mechanism may be used to reinforce the connection.

In some examples, to improve the structural strength of the alignment features 174 of the connection element 154, one or more tabs or tongues 194 may be formed along the side edge of each of the alignment features 174 (see FIGS. 4A and 4B). These tabs or tongues 194 may be inserted into a corresponding slot or groove 192 in the side wall 180. In some examples, to improve the structural strength of the second stand feature 179, one or more tabs 196 may be formed along the corresponding portion of the side edges 168 of the connection element 154. These tabs 196 may be inserted into a corresponding slot 192 in the side wall 180 (See FIGS. 4A and 4D). One or more tab-and-slot pairs may be formed in other suitable locations of the connection element 154 and the alignment element 156.

Further to reference to FIGS. 4A, 4B, 4C, and 4D, the supporting device 108 may further include a reinforcement element 158. In some examples, the reinforcement element 158 may include a pair of buttress-like structures. Each of the buttress-like structures may be joined to the bottom surface 166 of the elongated body 159 of the connection element 154 and to the adjacent surface of the first stand element 178 by welding, gluing, or any suitable method to support or reinforce the first stand element 178. In some examples, each of the buttress-like structures may be formed by extending the bottom sidewall portion 186 of the alignment element 156 toward the lower end of the connection element 154 and slightly bending the structures inward relative to the side edges 168 of the connection element 154 for better structural integrity (see FIGS. 4A and 4C). To fit the extension of the bottom sidewall 186 over the edge of the sensor assembly housing and onto or above the access cover 122, the bottom edge of the extension may be raised (see FIG. 4B). In some examples, each of the buttress-like structures may be formed as a separate structure from the side walls 180. Many other suitable methods may be used to form the buttress-like structures.

With reference to FIGS. 5A, 5B, 5C, and 5D, a second example of the supporting device 208 is described. Similar to the first supporting device 108, the second supporting device 208 may include a first element 254, such as a connection element, and a second element 256, such as an alignment element. The connection element 254 may be configured to operably support the seed follower 106 and/or attach the seed follower 106 thereto. The alignment element 256 may be configured to axially align the seed follower 106 with the seed tube 102 along their longitudinal axes.

The connection element 254 of the second supporting device 208 may include an elongated body 259 extending between an upper end and a lower end of the second supporting device 208. The elongated body 259 may take the form of a plate or the like. Thus, the elongated body 259 may include a substantially planar top surface facing the seed follower 106 attached thereto and a substantially planar bottom surface facing the access cover 122 of the sensor assembly 104. The plate may include two side edges delineating a width dimension of the connection element 254. The connection element 254 may be configured with a constant width or a varying width. In some examples, a width dimension of at least a portion of the connection element 254 may be configured to be similar to, or substantially the same as, the width dimension of the connection portion 144 of the seed follower 106 and/or the width dimension of the housing and the access cover 122 thereof of the sensor assembly 104. The connection element 254 of the second supporting device 208 may axially align with at least a portion of the connection portion 144 of the seed follower 106 and/or at least a portion of the access cover 122 of the sensor assembly 104 along their longitudinal axes when joined together as further described below.

The connection element 254 may include an alignment feature 274. The alignment feature 274 may be a recess or notch formed at an upper end of the elongated body 259. The recess may be configured to receive, in an abutting relationship, the connection fastener 138 positioned through the upper ear 136 of the access cover 122 and a corresponding ear formed at the upper leg 120 of the sensor assembly housing for joining the access cover 122 to the upper leg 120 of the sensor assembly housing. Positioning the connection fastener 138 in the recess of the connection element 254 may reduce upward shifting of the second supporting device 208 and/or the seed follower 106 attached thereto relative to the sensor assembly 104 and/or the seed tube 102. Depending on the desired length of the second supporting device 208 and the position of the second supporting device 208 relative to the sensor assembly 104, in some examples, the connection element 254 may not include a recess formed along its upper end. In some examples, the connection element 254 may include an aperture formed in an upper portion of the elongated body 259 and positioned in an alignment with the ears 136 of the sensor assembly housing for receiving therethrough the connection fastener 138.

With reference to FIGS. 5A, 5B, 5C, and 5D, the connection element 254 may include a connection feature 270. The connection feature 270 may be one or more apertures formed along the longitudinal dimension of the elongated body 259. In some examples, the one or more apertures 270 may be formed as separate individual openings. In some examples, the one or more apertures 270 may be defined by a slot having a varying width formed along the longitudinal center line of the connection portion 144. The wider portions of the slot may define the one or more apertures 270 connected by narrower portions of the slot. At least one of the one or more apertures 270 of the connection element 254 may be configured to selectively align with one or more apertures 150 formed in the connection portion 144 of the seed follower 106. Fasteners 172 may be positioned through the aligned apertures 150, 270 for adjustably and/or securely attaching the seed follower 106 to the connection element 254 of the second supporting device 208. Similar to the first supporting device 108, the second supporting device 208 also allows for an adjustable and/or secured attachment of the seed follower 106 to the seed tube 102 by selectively aligning one or more of the apertures 270 of the connection element 254 with one or more adjacent or non-adjacent apertures 150 of the seed follower 106 and joining the two using fasteners 172 positioned therethrough.

With reference to FIGS. 5A, 5B, 5C, and 5D, the alignment element 256 of the second supporting device 208 may include a pair of side plates or side walls formed along at least a portion, for example, an upper portion, of each of the side edges of connection element 254 of the second supporting device 208. In some examples, the side plates or side walls may be formed along other suitable portions, or the entirety, of the side edges of the connection element 254. The sidewalls may even extend axially beyond the upper and/or lower ends of the connection element 254. The side plates or the side walls may extend substantially perpendicularly to the connection element 254. Other extension angles may be implemented depending on the design of the seed follower 106, the sensor assembly 104, and/or the seed tube 102. Each of the top and/or bottom sidewall portions 284, 286 may include a profiled peripheral edge to reduce the material used to form the second supporting device 208.

Similar to the first supporting device 108, each of the pair of side walls may include a top sidewall portion 284 and a bottom sidewall portion 286. The top sidewall portions 284 extending upward from the top surface of the connection element 254 of the second supporting device 208 in combination with the connection element 254 may define in general a bracket for receiving a portion of the connection portion 144 of the seed follower 106. The top sidewall portions 284 may reduce lateral shift of the seed follower 106 when joined to the second supporting device 208. The bottom sidewall portions 286 extending downward from side edges of the connection element 254 in combination with the connection element 254 may collectively define in general a bracket for receiving a portion of the housing of the sensor assembly 104, for example, a portion of upper leg 120 of the housing. The bottom sidewall portions 286 may reduce lateral shift of the supporting device 208 and the seed follower 106 attached thereto relative to the sensor assembly 104 and/or the seed tube 102. The bottom sidewall portions 286 may extend downward beyond the upper leg 120 of the sensor housing, and may extend to cover portions of the side walls of the seed tube 102 to facilitate axial alignment between the seed tube 102 and the supporting device 208 and the seed follower 106 attached thereto.

In some examples, the top side wall portions 284 and/or the bottom sidewall portions 286 may be configured to abut the seed follower 106 and/or the upper leg 120 of the sensor housing, respectively. As such, when the seed follower 106 and the second supporting device 208 is positioned over the sensor assembly housing and the seed tube 102, the top and/or bottom sidewall portions 284, 286 may facilitate axially aligning the seed follower 106 with the seed tube 102 and reduce lateral shift of the seed follower 106 relative to the seed tube 102. In some examples, the side walls may be spaced apart at a distance slightly wider than the width dimension of the seed follower 106 and/or the width dimension of the upper leg 120 of the sensor housing to create a tolerance for easy installation of the various components.

Also similar to the first supporting device 108, each of the top sidewall portions 284 may include at least one securing structure 288 configured to receive a portion of a securing mechanism 190 for securing the second supporting device 208 and/or seed follower 106 to the seed tube 102 as described below. In some examples, the at least one securing structure 288 may be a top recess formed at the top edge of the top sidewall portion 284. Other securing structures 288 may be utilized, such as grooves, indentations, trenches, apertures, holes, slots, opening, and so on. The at least one top recess formed at one of the top sidewall portions 284 may be transversely aligned with the at least one top recess formed at the other one of the top sidewall portions 284 relative to the connection element 254.

Each of the at least one top recesses may be formed at an upper portion of each top sidewall portion 284 along the longitudinal axis of the second supporting device 208 such that the top recesses may be positioned at an upper position along the longitudinal axis relative to the apertures 270 of the connection element 254. Such configuration/positioning of the top recesses relative to the apertures 270 of the connection element 254 may reduce interference of the fasteners 172 for joining the seed follower 106 to the second supporting device 208 and the securing mechanism 190 for joining the second supporting device 208 and the seed follower 106 attached thereto to the seed tube 102. The top recesses may also be formed at a lower position along the longitudinal axis relative to the apertures 270 of the connection element 254. Alternatively, multiple securing structures 288, such as multiple top recesses, may be formed at either top sidewall portion 284 for receiving the securing mechanism 190 at multiple positions, including positions transversely overlapping with the aperture 270 positions. Depending on the locations of the fasteners 172 for attaching the seed follower 106, the securing mechanism 190 may be received at select securing structures 288 to reduce the interference. The multiple securing structures 288 may also receive multiple securing mechanisms 190 for secured attachment.

Further, similar to the first supporting device 108, each of the bottom sidewall portions 286 may include a positioning feature 282 for accommodating the side fasteners 134 for securing the sensor assembly 104 to the seed tube 102. In some examples, the positioning feature 282 may include a recess or a notch formed at the bottom edge of the bottom sidewall portion 286. Other positioning features 282 may be used, such as indentations, grooves, trenches, holes, apertures, slots, openings, and so on. In some examples, the positioning feature 282 may be a domed portion formed at either bottom sidewall portion 286 so as to cover the fasteners 134 that attach the sensor assembly 104 to the seed tube 102. A portion of the positioning feature 282 may be configured to abut the side fasteners 134 for joining the seed sensor assembly 104 to the seed tube 102. The abutment between the positioning feature 282 and the side fasteners 134 may reduce axial shift of the second supporting device 208 and the seed follower 106 attached thereto relative to the seed tube 102.

In some examples, the portion of the positioning feature 282 abutting the side fasteners 134 may abut the upper portion of the side fasteners 134. As described earlier, the connection element 254 of the second supporting device 208 may include a recess formed along its upper end abutting a lower portion of the top fastener 138 of the sensor assembly 104. The abutment between the positioning features 282 formed at the bottom sidewall portions 286 and the side fasteners 134 and the abutment between the recess formed along the upper end of the connection element 254 and the top fastener 138 may collectively reduce either upward or downward axial shift of the seed follower 106 along its longitudinal axis relative to the seed sensor assembly 104 and/or the seed tube 102. Depending on the location of the side fasteners 134 and the top fastener 138 of the seed sensor assembly 104, the positioning features 282 may abut a different portion of the side fasteners 134 to reduce axial shift of the seed follower 106.

With reference again to FIGS. 5A, 5C, and 5D, the connection element 254 may further include a stand feature or a foot feature 278 positioned adjacent to the lower end, or any suitable location, of the connection element 254 to support the connection element 254 at a predetermined angle relative to the access cover 122 of the sensor assembly housing, thereby supporting the seed follower 106 at a predetermined angle relative to the sensor assembly housing and the seed tube 102. As discussed earlier, the predetermined angle may range from 2 to 10 degrees to enhance the performance of the seed follower 106. In some examples, the stand feature 278 of the supporting device 208 may be configured to allow an angle of 30 degrees formed between engagement portion 148 of the seed follower 106 relative and the ground. Depending on the specific designs of the seed follower 106, seed tube 102, seed sensor assembly 104, and/or the planting unit 100, other angles, at which the supporting device 208 may support the seed follower 106, and/or at which the engaging portion 148 of the seed follower 106 may enter the furrow, may be used.

The stand feature 278 may include one or more tabs or plate-like extensions extending downward from the bottom surface of the connection element 254 to a predetermined distance and joined thereto. In some examples, the connection element 254 may simply include a downward extending flange formed along at least a portion of the lower end of the connection element 254. In some examples, the second supporting device 208 may not include a stand feature 278. The bottom of the connection element 254 may simply rest against the sensor assembly housing. In some examples, the connection element 254 may be formed as a wedge having a varying thickness to allow the seed follower 106 to be positioned at a certain angle relative to the seed tube 102 and/or the furrow.

Figure 6A:
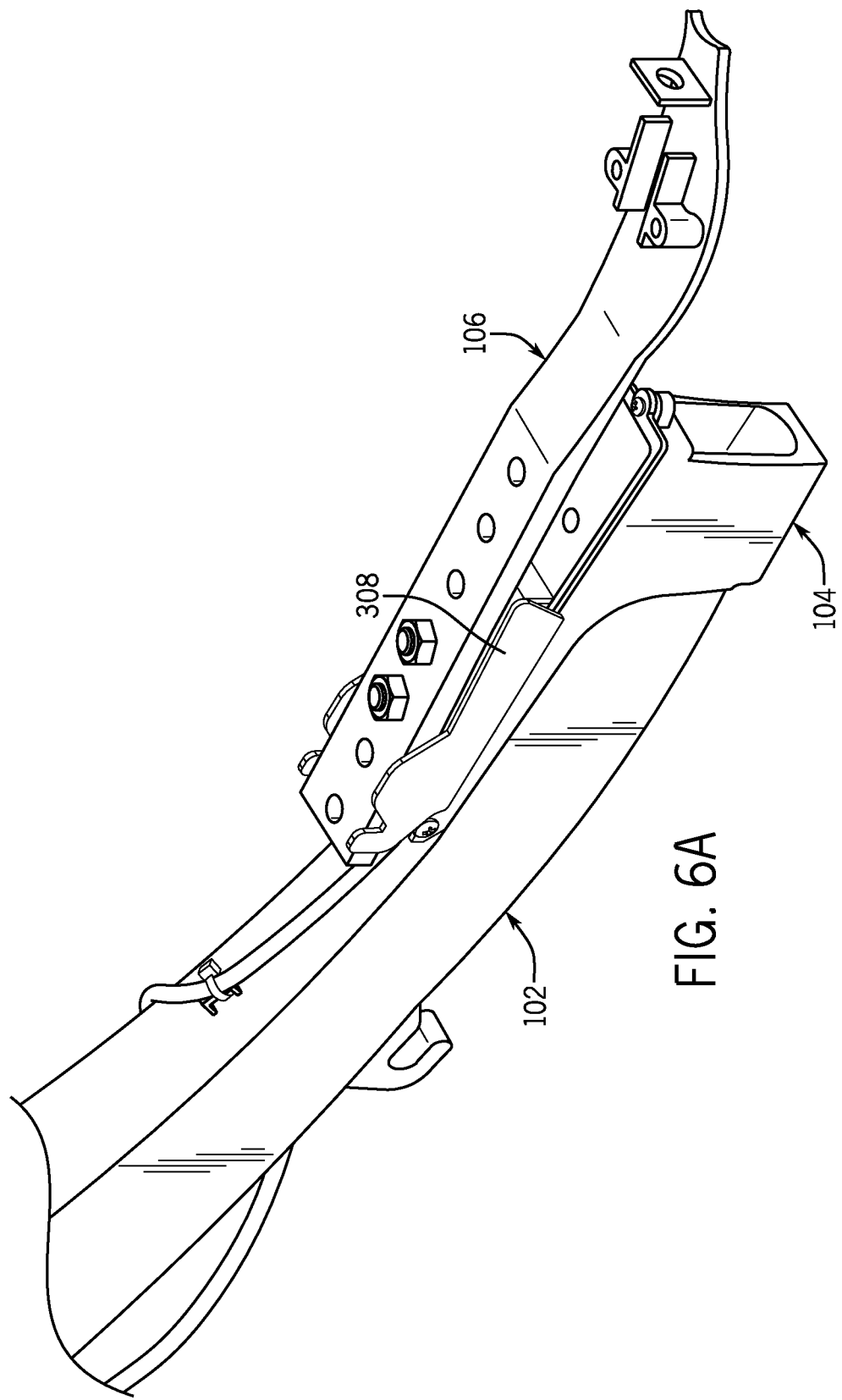
FIG. 6A is a perspective view of a portion of a planting unit similar to that of FIG. 1, incorporating a third example of a supporting device.
Figure 6B:
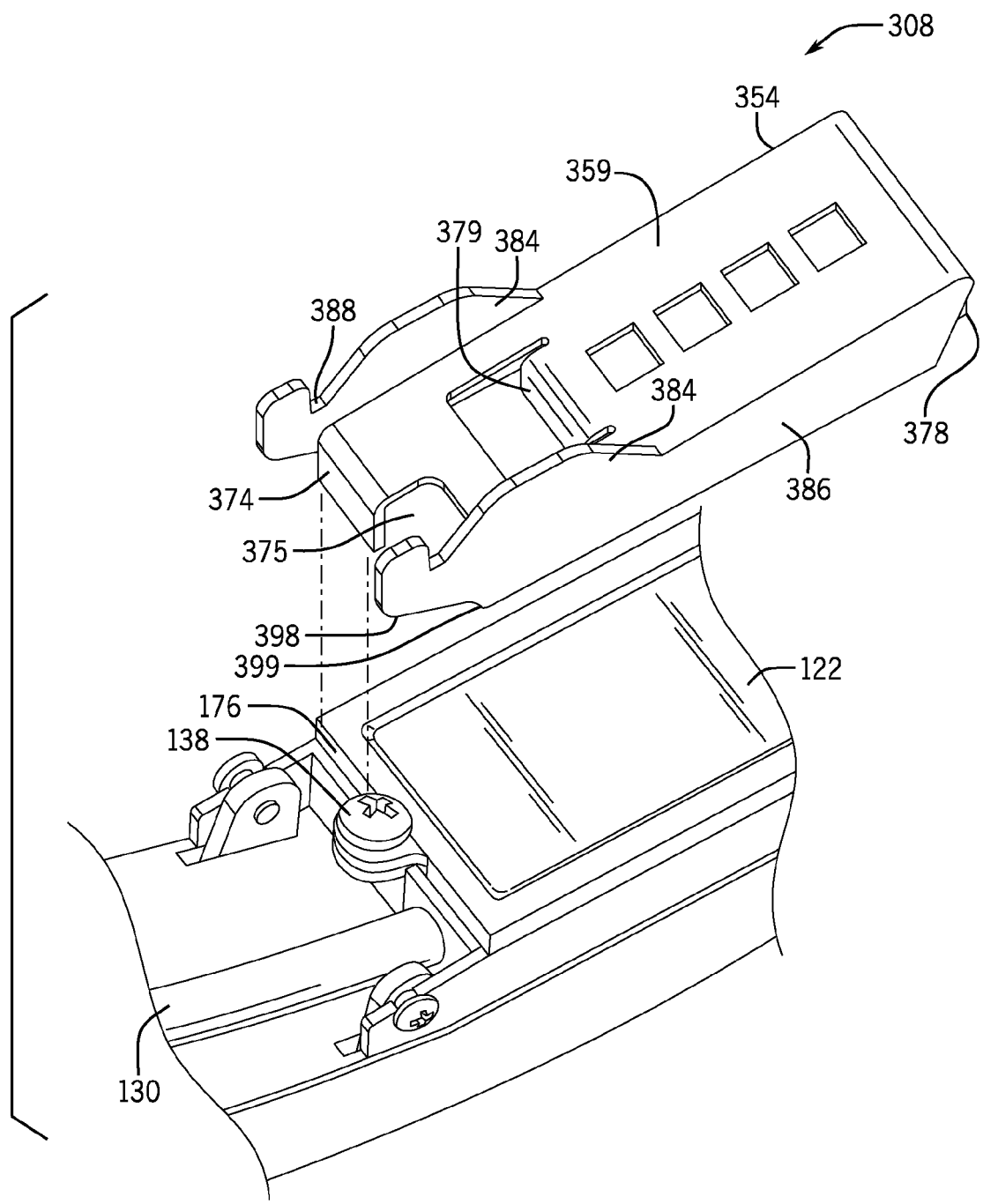
FIG. 6B is an exploded view of the portion of the planting unit of FIG. 6A, showing only portions of the seed tube and the third supporting device.

With reference to FIGS. 6A and 6B, a third example of a supporting device 308 is described. FIG. 6A shows a perspective view of a portion of a planting unit 100 similar to that of FIG. 1, incorporating the third example of the supporting device 308. To better illustrate the structure of the supporting device 308, the securing mechanisms 190 (e.g., one or more zip ties) are removed. Similar to the first and second examples of the supporting devices 108, 208, the third supporting device 308 may include a first element 354, such as a connection element, and a second element, such as an alignment element. The connection element 354 may be configured to operably support the seed follower 106 and/or attach the seed follower 106 thereto. The alignment element may be configured to axially align the seed follower 106 with the seed tube 102 along their longitudinal axes.

The connection element 354 of the third supporting device 308 may include a connection feature similar to that of the first supporting device 108. The connection feature may include one or more axially aligned apertures along the longitudinal dimension of the third supporting device 308 formed in the elongated, plate-like portion 359 of the connection element 354. Select apertures of the connection element 354 may align with select apertures 150 of the seed follower 106. One or more fasteners 172 may be positioned through one or more pairs of aligned apertures 150 to secure the seed follower 106 to the supporting device 308. The connection element 354 of the third supporting device 308 may further include one or more stand features 378, 379, such as a first stand feature 378 and/or a second stand feature 379 similar to the first and second stand features 178, 179 of the first supporting device 108. The one or more stand features 378, 379 may be configured to support the plate-like portion of the connection element 354 and the seed follower 106 attached thereto at a predetermined angle Δ relative to the access cover 122 of the sensor assembly housing. The predetermined angle Δ may be formed by either raising or lowering one end of the plate-like portion relative to the other end of the plate-like portion with respect to the access cover 122 of the sensor assembly housing.

The connection element 354 of the third supporting device 308 may further include an alignment feature 374 to reduce upward and/or downward shifting of the supporting device 308 relative to the seed sensor 104 and/or the seed tube 102. The alignment feature 374 of the connection element 354 may include a downward extending tab or flange-like extension at an upper end of the elongated plate-like portion 359 of the connection element 354 (see FIG. 6B). Unlike the two tab or flange-like extensions of the first supporting device 108, each of which may abut an upper terminal end 175 of the upper leg 120 of the sensor assembly housing, the one tab or flange-like extension 374 of the third supporting device 308 may abut a portion of an upper edge 176 of the access cover 122 of the sensor assembly housing (see FIG. 6B). Referring back to FIG. 3, the upper edge 176 of the access cover 122 may include a left portion and a right portion with the ear 136 and the connection fastener 138 positioned in between. Depending on the design of the sensor assembly 104, the left portion and the right portion of the upper edge 176 of the access cover 122 may have similar dimensions. In some examples, one of the left and/or the right portions of the upper edge 176 of the access cover 122 may be wider than the other. The tab or flange-like extension 374 of the third supporting device 308 may be configured to abut either one of the left portion or the right portion of the upper edge 176 of the access cover 122 (see FIG. 6C). Thus, an opening 375 may be formed between the tab or flange-like extension 374 and one side wall of the third supporting device 308 (described below) to allow the cables or harnesses 130 of the sensor assembly 104 to pass through.

In some examples, the tab or flange-like extension may be configured to be similar to, or substantially the same as, the width dimension of the abutting left or right portion of the upper edge 176 of the access cover 122. In some examples, the tab or flange-like extension may be configured to be smaller than the width dimension of the abutting left or right portion of the upper edge 176 of the access cover 122, but may be no less than a predetermined width to reduce lateral or rotational shift of the connection element 354 relative to the seed sensor housing. In the case where the width dimension of the tab or flange-like extension may be smaller than the width dimension of the abutting left or right portions of the upper edge 176 of the access cover 122, the tab or flange-like extensions may be positioned off centered with respect to the access cover 122 to help minimize rotational shift of the supporting device 308 relative to the sensor assembly housing. Although one tab or flange-like extension is described herein, the connection element 354 of the supporting device 308 may be configured with more than one tab or flange-like extension abutting portions of the left portion and/or the right portion of the upper edge 176 of the access cover 122.

The alignment element of the third supporting device 308 may include a pair of side plates or side walls extending substantially perpendicularly, or at any suitable angle, relative to the connection element 354. Each side plate or side wall may include a top side wall portion 384 and a bottom side wall portion 386 formed along the side edge of connection element 354 of the third supporting device 308. In some examples, the top sidewall portions 384 may extend upward along an upper or middle portion of the side edge of the connection element 354. The bottom sidewall portion 386 may extend downward along the entirety of the side edge of the connection element 354 to engage a longer portion of the sensor housing assembly 104 as compared to the first and second supporting devices 108, 208. The top and/or bottom sidewall portions 384, 386 may extend along any suitable portions of the side edge of the connection element 354 and may even extend axially beyond the upper and/or lower ends of the connection element 354. The top and/or bottom sidewall portions 384, 386 may include profiled peripheral edges to reduce the material used to form the supporting device 308.

Similar to the first and second supporting devices 108, 208, the third supporting device 308 may form a first bracket, such as a top bracket defined by the top sidewall portions 384 and the connection element 354, for receiving a portion of the seed follower 106, and a second bracket, such as a bottom bracket defined by the bottom sidewall portions 386 and the connection element 354, for receiving portions of the seed sensor assembly 104 and/or the seed tube 102. The top bracket and/or the bottom bracket of the first, second, and/or third supporting devices 108, 208, 308 may facilitate axial alignment of the supporting device 108, 208, 308, the seed follower 106, the seed sensor assembly 104, and/or the seed tube 102 along their longitudinal axes, and may reduce lateral or rotational shift of the components relative to each other.

A pair of transversely aligned securing structures 388, similar to the securing structures 188, 288 of the first and second supporting devices 108, 208, may be formed along the top edges of the top sidewall portions 384 of the third supporting device 308 and configured to receive portions of a securing mechanism 190 for securing the supporting device 308 and/or seed follower 106 to the seed tube 102. The securing structures 388 may take the form of recesses, grooves, indentations, trenches, apertures, holes, slots, openings, and so on. The pair of the securing structures 388 may be formed at an upper position along the longitudinal axis relative to the apertures of the connection element 354 to reduce possible interference of the fasteners 172 for joining the seed follower 106 to the supporting device 308 and the securing mechanism 190 for joining the supporting device 308 and the seed follower 106 attached thereto to the seed tube 102. Other suitable positions to form the securing structures 388 may be contemplated. The bottom of each securing structure 388 may be configured to be lower than the top surface of the seed follower 106 such that the securing mechanism 190 may rest against the top surface of the seed follower 106 instead of the bottom edge portion of the securing structure 388. Such configuration reduces wear on the securing mechanism 190 and may further reduce any shifting of the seed follower 106 relative to the supporting device 308, the seed sensor assembly 104, and/or the seed tube 102 due to the increased contact surface between the securing mechanism 190 and the seed follower 106. More than one pair of transversely aligned securing structures 388 may be formed.

The alignment element of the third supporting device 308 may also include a positioning feature for positioning the supporting device 308 at a desired location along the longitudinal dimension of the seed tube 102. The positioning feature may be a slanted edge portion 398 formed by cutting out a corner portion of each of the bottom sidewall portions 386 of the alignment element. In some examples, the corners of the bottom sidewall portions 386 that are adjacent to the side connection fasteners 134 for attaching the seed sensor assembly 104 to the seed tube 102 may be cut out. The supporting device 308 may be positioned on the seed tube 102 and/or the seed sensor assembly 104 in a manner such that the slanted edge portion 398 of each bottom sidewall portion 386 formed by the cut may be positioned in close proximity to the side connection fasteners 134, or may engage or abut a portion of the connection fastener 134 to reduce downward and/or upward shifting of the supporting device 308 along the longitudinal axis of the seed tube 102 and/or the seed sensor assembly 104. Although the word "cut" or "cut out" is used herein to aid understanding, the side walls may be formed with a slanted edge portion 398 using any suitable method, such as molding, casting, and so on.

In some examples, the slanted edge portion 398 may include a curved edge portion 399 adjacent to the side connection fastener 134 of the seed sensor assembly 104. The curved edge portion 399 may conform to and/or engage or abut a portion of the periphery of the side connection fasteners 134. In some examples, the curved edge portion 399 may be configured to surround and/or abut a downward half of the periphery of the connection fastener 134. As such, the curved edge portion 399 of each bottom sidewall portion 386 may essentially form an upward opening recess surrounding a lower side of the connection fastener 134. Many other suitably curved edge portion 399s may be contemplated to engage a portion of the side connection fastener 134 so as to position the supporting device 308 at a desired location along the longitudinal axis of the seed tube 102.

As described earlier, the alignment feature of the connection element 354 of the third supporting device 308, such as the downward extending tab or flange-like extension 374, may abut a portion of the upper edge 176 of the access cover 122 of the sensor assembly housing. The close proximity, engagement, or abutment between the positioning feature and the downward portions of the side fasteners 134 of the seed sensor assembly 104, in combination with the abutment between the alignment feature and the access cover 122 of the seed sensor assembly, may limit upward and/or downward shifting of the supporting device 308 and the seed follower 106 attached thereto relative to the seed sensor assembly 104 and/or the seed tube 102.

The side walls of the alignment element may be joined to the connection element 354 in a similar manner as described above with respect to the first and second supporting devices 108, 208. The side walls of the alignment element may be joined to the connection element 354 by welding, gluing, adhering, and so on. Mating structures may also be formed along the side edges of the connection element 354s and in the side walls, such as tab and slot or tongue and groove pairs. The side walls of the alignment element and the connection element 354 may be formed as an integral piece by casting, molding, and so on. Any other suitable method may be contemplated.

Figure 6C:
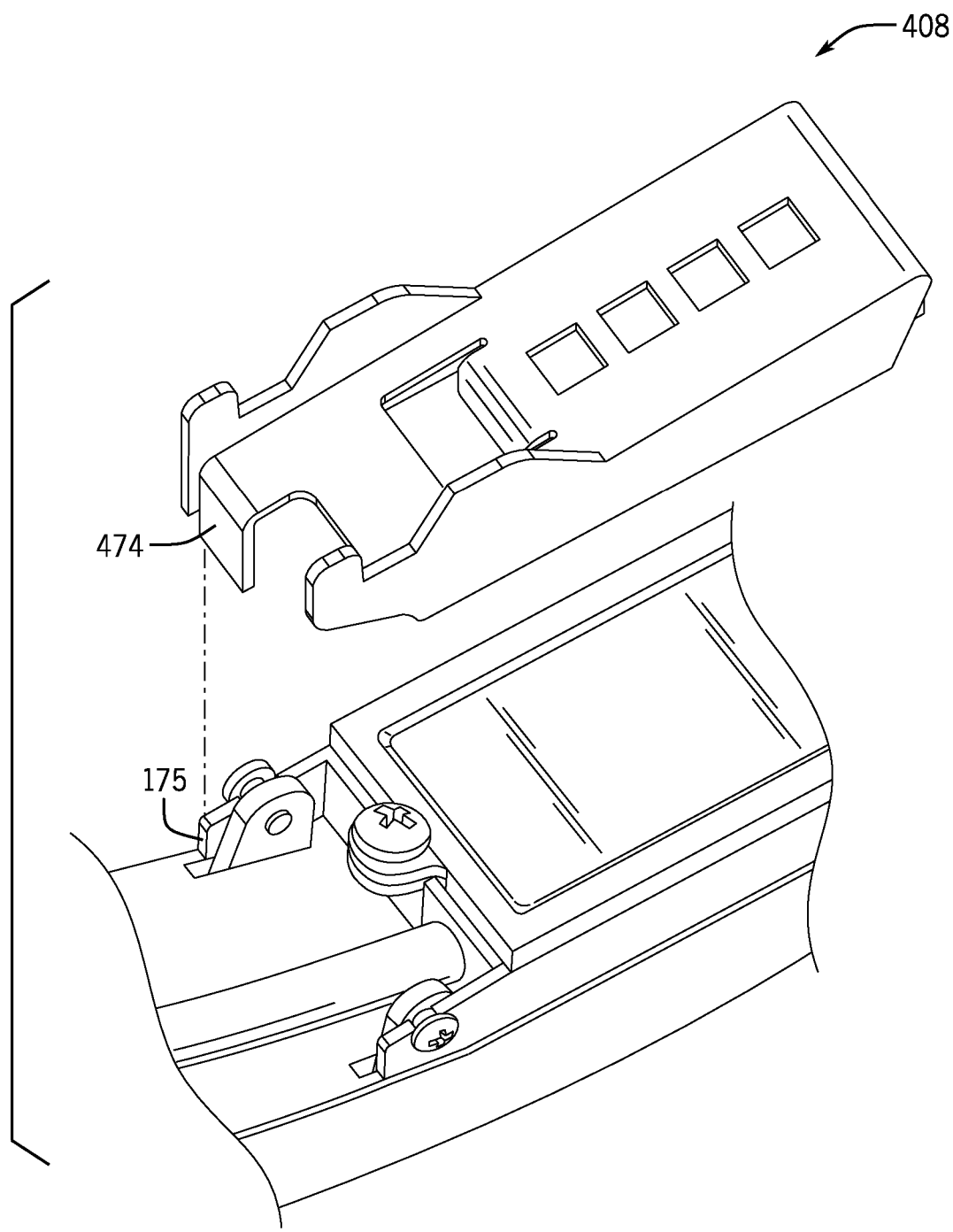
FIG. 6C is an exploded view, similar to FIG. 6B, showing portions of the seed tube and a fourth example of a supporting device.
Figure 7A:
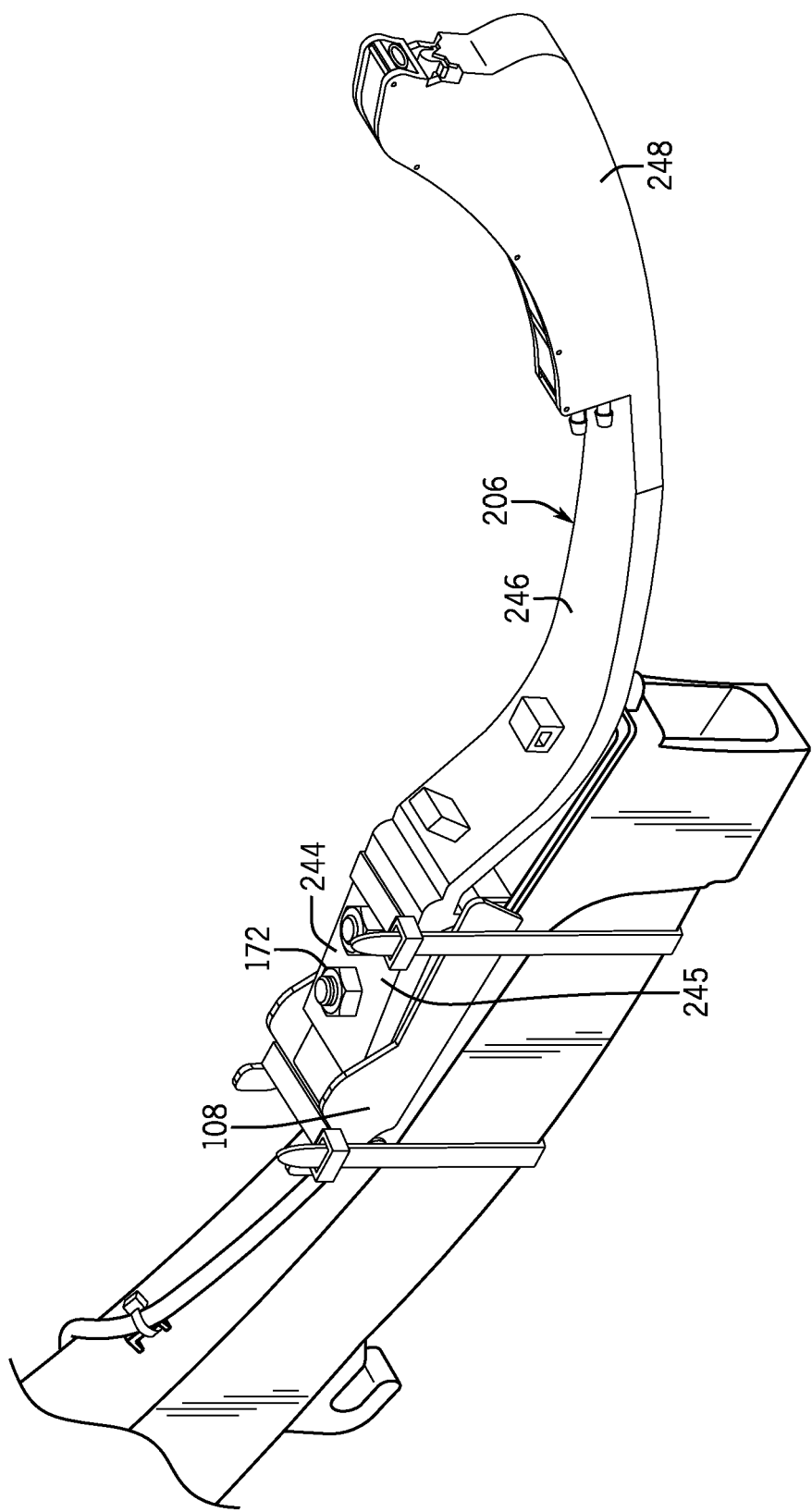
FIG. 7A is a perspective view of a portion of a planting unit similar to that of FIG. 1, incorporating the fourth example of the supporting bracket and a second example of a seed follower different from that shown in FIG. 1.
Figure 7B:
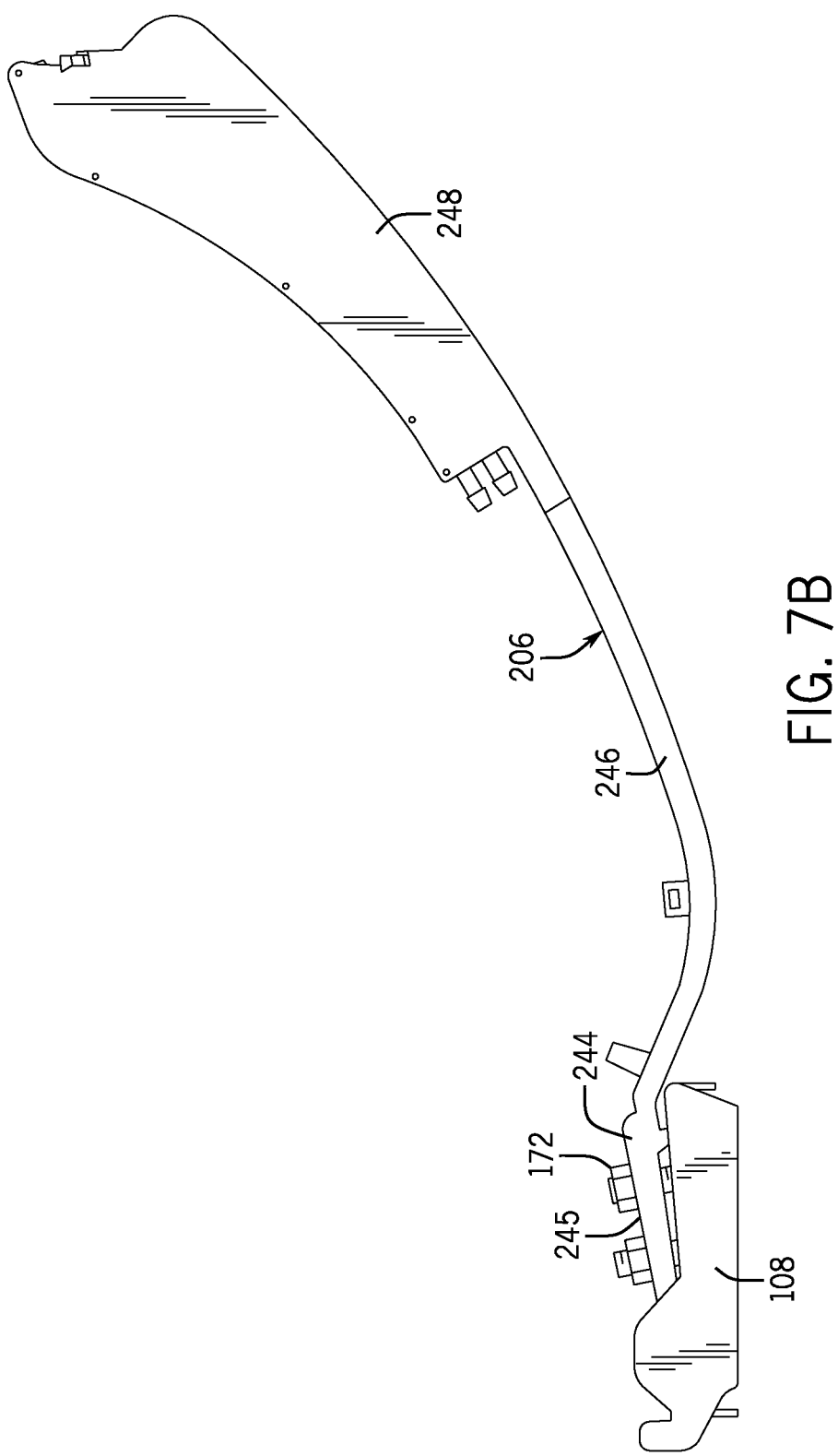
FIG. 7B is a side elevation view of the supporting bracket and the seed follower shown in FIG. 7A.
Figure 7C:
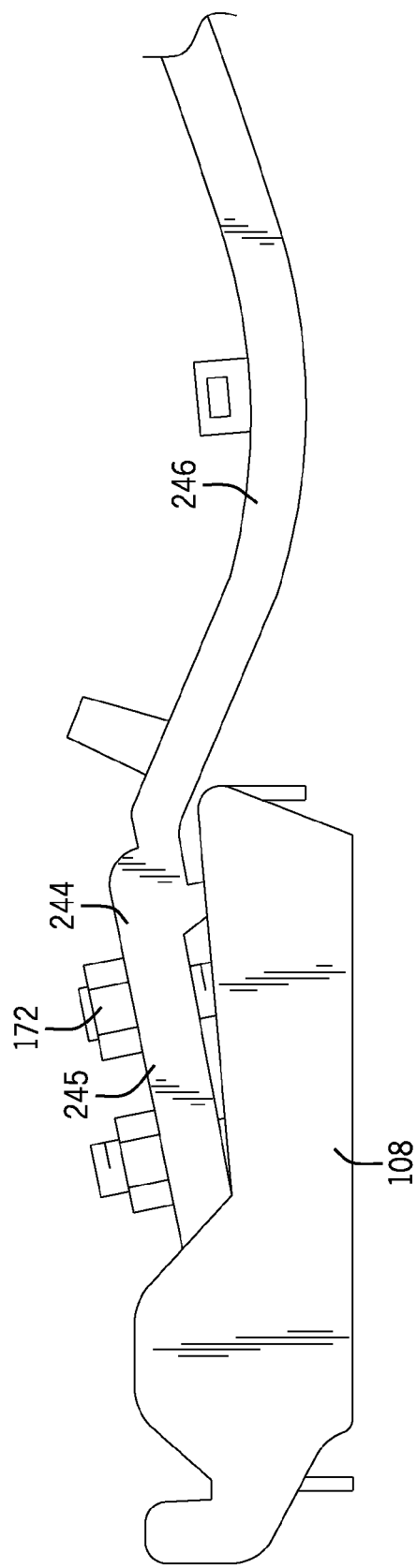
FIG. 7C is an enlarged view of the supporting bracket and a portion of the seed follower shown in FIG. 7B.
Figure 7D:
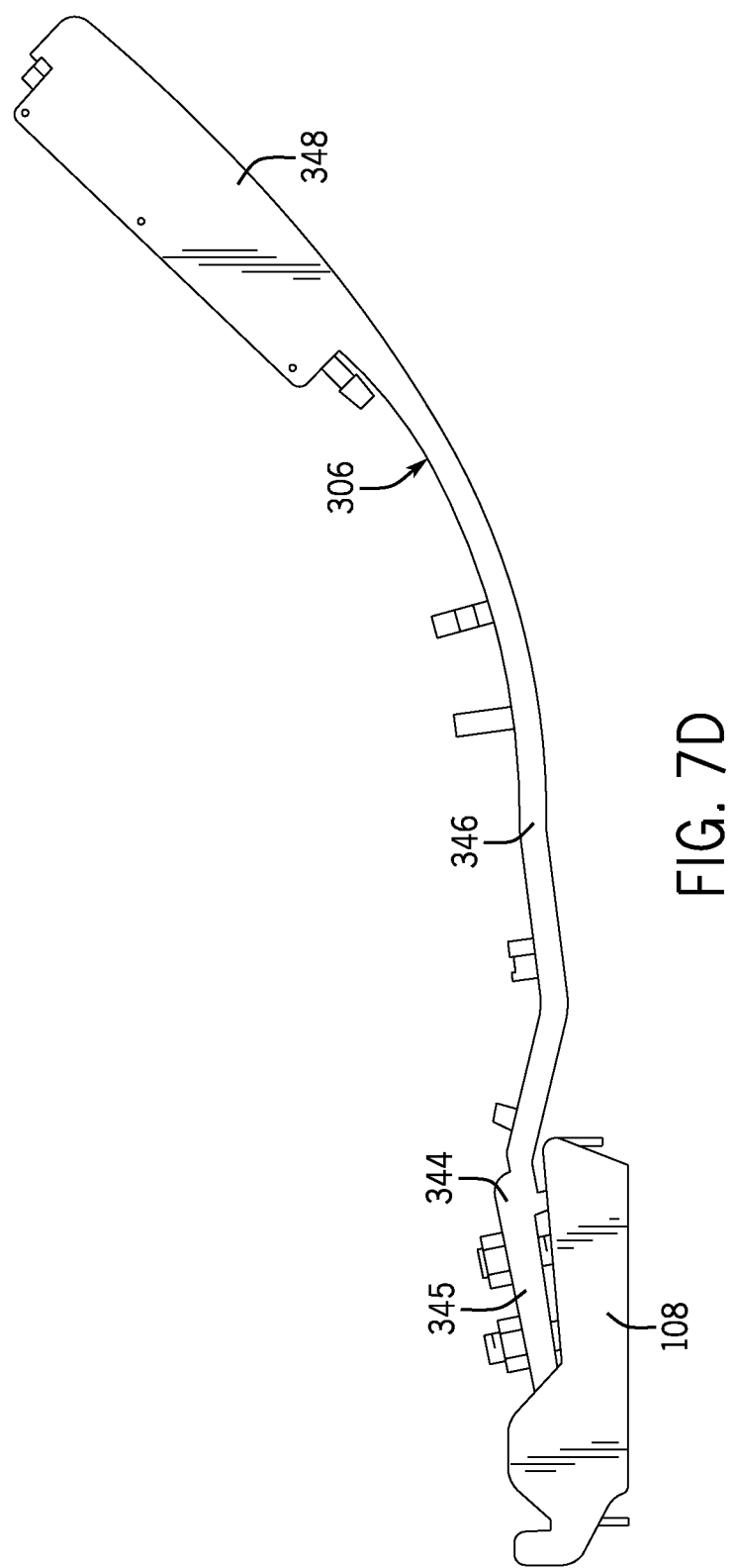
FIG. 7D is a side elevation view, similar to FIG. 7B, showing the supporting bracket and a third example of a seed follower.
Figure 8B:
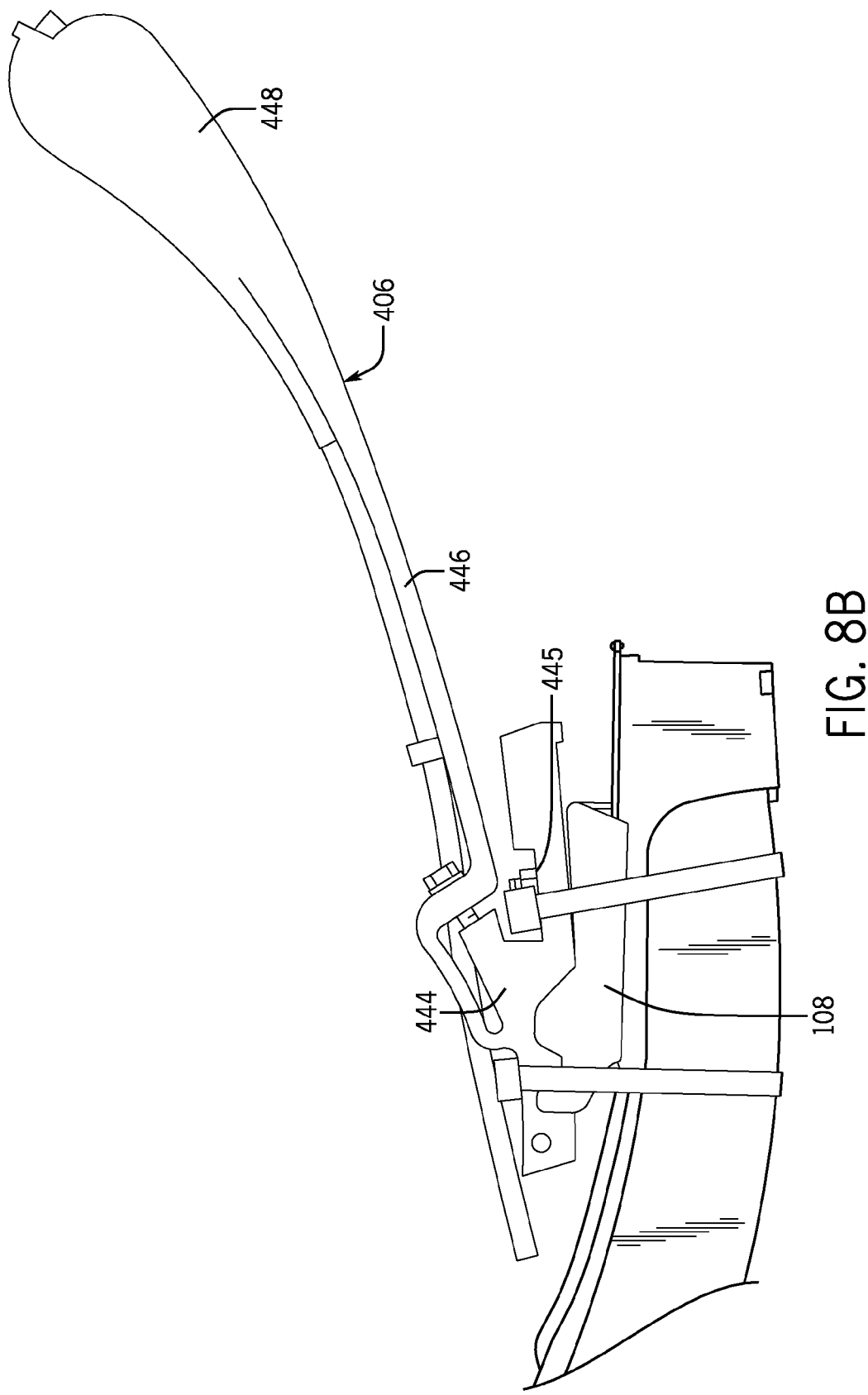
FIG. 8B is a side elevation view of the portion of the planting unit of FIG. 8A.

Referring to FIG. 6C, a fourth example of a supporting device 408 is described. The fourth supporting device 408 is similar to the supporting devices 108, 208, 308 as described above in that the fourth supporting device 408 may include a connection element for supporting and/or connecting a seed follower 106 to the seed tube 102 and an alignment element for positioning the seed follower 106 at a desired location of the seed tube 102 and for axially aligning the seed follower 106 with the seed tube 102 along their longitudinal axes.

The connection element may include a connection feature (e.g., one or more apertures for attaching the seed follower thereto) and a stand feature (e.g., one or more plate or flange-like extensions configured to support the seed follower at a desired angle relative to the furrow) that are similar to the connection features 170, 270 and stand features 178, 179, 278, 378, 379 as described above with respect to the other examples of supporting devices 108, 208, 308. The connection element may also include an alignment feature 474 to reduce axial shift of the supporting device 408 relative to the seed tube 102. Similar to the third example of the supporting device 308, the alignment feature 474 of the fourth supporting device 408 may include one downward extending tab or flange-like extension positioned opposite the seed sensor cables or harnesses 130 with respect to the upper connection fastener 138 for joining the access cover 122 to the housing body 118. Different from the third supporting device 308 while similar to the first supporting device 108, the downward extending tab or flange-like extension 474 of the fourth supporting device 408 may be configured to abut the upper terminal end 175 of a side wall of the upper leg 120 of the sensor assembly housing (see FIG. 6C and FIG. 3).

The alignment element of the fourth supporting device 408 may be similar to the previous examples in that it is configured to axially align the seed follower 106 with the seed tube 102 along their longitudinal axes, although the specific structures may be different. The alignment element of the fourth supporting device 408 may include a pair of side plates or side walls similar to that of the third example 308, except that the side wall portion adjacent to the alignment feature 474 of the connection element, i.e. the downward extending tab or flange-like extension of the connection element, may be configured to be similar to a corresponding portion of the first supporting device 108. As such, the alignment feature 474 of the connection element and the adjacent sidewall portion (more specific, a portion of the bottom sidewall portion adjacent to the alignment feature) may be configured to form a T-beam like structure for improved structural strength. A positioning feature similar to that of the first supporting device 108, such as a recess or a notch, may also be formed at the same bottom sidewall portion at the location corresponding to the side connection fastener 134 of the seed sensor assembly 104.

With reference to FIGS. 7A, 7B, 7C, 7D, 8A, and 8B, another three examples of seed followers 206, 306, 406 are described. The second, third and fourth seed followers 206, 306, 406 each may be a seed firmer configured to press seeds into the seed furrow. Each of the seed firmers may include a connection portion 244, 344, 444 at an upper end of the seed firmer, an engaging portion 248, 348, 448 at an lower end of the seed firmer and a neck portion 246, 346, 446 joining the connection portion 244, 344, 444 and the engaging portion 248, 348, 448. The connection portion 244, 344, 444 may include a planar portion 245, 345, 445. One or more apertures may be formed through the planar portion 245, 345, 445 for receiving one or more fasteners 172 for joining the seed firmer to one of the supporting devices 108, 208, 308, 408 described herein. Different from the first example of the seed follower 106 of FIG. 1, the engaging portion 248, 348, 448 of each of the second, third and fourth seed followers 206, 306, 406 may be configured with a raised elevation when viewed from the side (see FIGS. 7B, 7C, 7D, and 8B) and a reduced width dimension when viewed from the top (see FIGS. 7A and 8A) as compared to their respective connection portions 244, 344, 444. As such, the neck portion 246, 346, 446 of each seed firmer may include a varying width dimension along the longitudinal dimension of the seed firmer. The seed firmer may further include channels or hooks for guiding liquid fertilization tubes or such.

Connecting the second, third, or the fourth seed followers 206, 306, 406 using a supporting device 108, 208, 308, 408 as described herein provides many advantages as compared to existing connection methods for these or similar seed followers. The supporting device 108, 208, 308, 408 may allow the entrance position of the second, third, or the fourth seed follower 206, 306, 406 into a furrow to be adjusted by selectively aligning the apertures of the second, third, or the fourth seed follower 206, 306, 406 and the connection element 154, 254, 354 of the supporting device 108, 208, 308, 408 so as to work on different type of soils. The stand feature 178, 179, 278, 378, 379 of the supporting device 108, 208, 308, 408 may further allow the second, third, or fourth seed followers 206, 306, 406 to enter the seed furrow at a desired angle. As such, the adjustable attachment of the second, third, or fourth seed follower 206, 306, 406 to the seed tube 102 offered by the supporting device 108, 208, 308, 408 as described herein may allow the pressure applied by the second, third, or fourth seed followers 206, 306, 406 onto the seeds to be adjusted. Therefore, the supporting device 108, 208, 308, 408 may overcome issues associated with excessive pressure applied by the second, third, or the fourth seed followers 206, 306, 406 when using traditional attachment methods. Furthermore, the supporting device 108, 208, 308, 408 as described herein may also reduce longitudinal, lateral, and/or rotational shift of the second, third, or the fourth seed followers 206, 306, 406 relative to the seed tube 102.

Referring back to FIGS. 1, 2, 3, 7A, and 8A, one or more securing mechanisms 190 may be provided for further securing any of the seed followers 106, 206, 306, 406 as described herein to the seed tube 102. In some examples, the securing mechanisms 190 may include one or more elongated members, such as one or more zip ties. Other securing mechanisms 190 may be used, such as straps, hook and loop fasteners, ropes, tapes, and so on. Each of the zip ties 190 may be looped around the top surface of the seed follower 106, 206, 306, 406, opposing side walls 128 of the seed sensor assembly housing, opposing side walls 114 of the seed tube 102, and/or the bottom wall 112 of the seed tube 102 to secure the seed follower 106, 206, 306, 406 and the support device 108, 208, 308, 408 to the seed sensor assembly 104 and the seed tube 102. At least one of the zipper ties 190 may be received in the securing structures 188, 288, 388 of the top sidewall portions of the supporting device 108, 208, 308, 408 so as to reduce the axial shift of the zipper tie 190, the seed follower 106, 206, 306, 406, and/or the supporting device 108, 208, 308, 408 from axially shift relative to the seed tube 102. In some examples, the tail portions of the one or more zipper ties 190 may remain (see FIGS. 1, 2, 3, and 7A). In some examples, the tail portions may be cut off (see FIG. 8A).

The supporting devices 108, 208, 308, 408 as described herein may be formed using many suitable methods. The supporting devices 108, 208, 308, 408 may be cast or molded as an integral body or built up with multiple parts welded or glued together or any other suitable connection mechanism. The supporting devices 108, 208, 308, 408 may be formed from a metal plate such as steel, steel alloy, or other metals. Hardening, annealing, or other heat treatments may be provided. The supporting devices 108, 208, 308, 408 may be corrosion resistant by being made from stainless steel or being galvanized, painted, or otherwise protected. The supporting devices 108, 208, 308, 408 may also be coated or formed from suitable materials to magnetically shield the seed sensor assembly 104 from adjacent planting unit components. The supporting devices 108, 208, 308, 408 may also be formed from suitable plastics. The connection element 154, 254, 354 and/or the side walls 180 of the supporting devices 108, 208, 308, 408 may have a thickness ranging from approximately 0.03 inches to approximately 0.2 inches. Other thickness ranges may also be provided.

While multiple supporting devices 108, 208, 308, 408 are described herein as examples, still other examples of the supporting device 108, 208, 308, 408 may be contemplated. Each of the various aspects and features of the exemplary supporting devices 108, 208, 308, 408 may advantageously be used separately in some instances, or in combination with other aspects and features of the supporting devices 108, 208, 308, 408 in other instances.

A seed follower 106, 206, 306, 406 is described herein as an exemplary component that may be connected to be seed tube 102 using the supporting devices 108, 208, 308, 408 as described herein. Other planting unit components, including other furrow devices, may be connected to the seed tube 102 using the supporting devices 108, 208, 308, 408. In fact, the connection features 170, 270 of the supporting devices 108, 208, 308, 408 provide additional mounting points for various planting unit components, which allow more secured attachments and offer more flexibility for supporting and/or connecting various planting unit components to the seed tube 102.

All directional references (e.g., upper, lower, upward, downward, left, right, leftward, rightward, top, bottom, above, below, inner, outer, vertical, horizontal, clockwise, and counterclockwise) are only used for identification purposes to aid the reader's understanding of the examples of the disclosure, and do not create limitations, particularly as to the position, orientation, or use of the disclosure unless specifically set forth in the claims. Joinder references (e.g., attached, coupled, connected, joined, and the like) are to be construed broadly and may include intermediate members between a connection of elements and relative movement between elements. As such, joinder references do not necessarily infer that two elements are directly connected and/or in fixed relation to each other.

In some instances, components are described with reference to "ends" having a particular characteristic and/or being connected with another part. However, those skilled in the art will recognize that the present disclosure is not limited to components which terminate immediately beyond their points of connection with other parts. Thus, the term "end" should be interpreted broadly, in a manner that includes areas adjacent, rearward, forward of, or otherwise near the terminus of a particular element, link, component, part, member or the like.

In methodologies directly or indirectly set forth herein, various steps and operations are described in one possible order of operation, but those skilled in the art will recognize that steps and operations may be rearranged, replaced, or eliminated or have other steps inserted without necessarily departing from the spirit and scope of the present disclosure. It is intended that all matter contained in the above description or shown in the accompanying drawings shall be interpreted as illustrative only and not limiting. Changes in detail or structure may be made without departing from the scope of the disclosure as defined in the appended claims.

Although the present disclosure has been described with respect to particular apparatuses, configurations, components, systems and methods of operation, it will be appreciated by those of ordinary skill in the art upon reading this disclosure that certain changes or modifications to the embodiments and/or their operations, as described herein, may be made without departing from the scope of the disclosure. Accordingly, the proper scope of the disclosure is defined by the appended claims. The various embodiments, operations, components and configurations disclosed herein are generally exemplary rather than limiting in scope.

What is claimed is:

1. A supporting device for operably connecting a furrow device to a seed tube of a planting unit for planting seeds into a furrow, the supporting device comprising:
   a connection element, the connection element including a connection feature configured to attach the furrow device to the supporting device and a stand feature to position the furrow device at a desired angle relative to the furrow; and
   an alignment element joined to the connection element, the alignment element including a first alignment feature configured to axially align a longitudinal axis of the supporting device with a longitudinal axis of the seed tube and a positioning feature to position and retain the furrow device at a desired location along opposite directions of a longitudinal dimension of the seed tube,
   wherein the stand feature comprises a first plate or flange extension extending downwardly from the connection element at a first distance and a second plate or flange extension extending downwardly from the connection element at a second distance different from the first distance, the first plate or flange extension and the second plate or flange extension spaced apart along the longitudinal axis of the supporting device.

2. The supporting device according to claim 1, wherein the connection element comprises an elongated body.

3. The supporting device according to claim 2, wherein the elongated body comprises a plate including a width dimension similar to or substantially the same as a width of the furrow device joined to the supporting device.

4. The supporting device according to claim 2, wherein the connection feature comprises at least one aperture formed in the elongated body.

5. The supporting device according to claim 1, the connection element further comprising a second alignment feature that is configured to reduce axial shift of the furrow device relative to the seed tube along the longitudinal dimension of the seed tube.

6. The supporting device according to claim 5, wherein the positioning feature of the alignment element comprises a recess proximal to an end of the elongated body and distal from a lower egress end of the seed tube, and the recess abuts a portion of a fastener of a seed sensor assembly joined to the seed tube.

7. The supporting device according to claim 1, wherein the first alignment feature of the alignment element comprises two side walls, each positioned along at least a portion of a longitudinal side edge of the connection element.

8. The supporting device according to claim 7, wherein the side walls extend substantially perpendicularly to the connection element.

9. The supporting device according to claim 7, wherein at least one of the side walls includes at least one of a top sidewall portion or a bottom sidewall portion.

10. The supporting device according to claim 9, wherein the top sidewall portion comprises a profiled top edge, and at least a portion of the top sidewall portion extends above a top surface of the furrow device joined to the supporting device.

11. The supporting device according to claim 9, wherein the top sidewall portion comprises a securing structure for receiving at least a portion of a securing mechanism that secures the furrow device and/or the supporting device to the seed tube.

12. The supporting device according to claim 11, wherein the securing structure comprises a recess formed along a top edge of the top sidewall portion.

13. The supporting device according to claim 11, wherein the securing mechanism comprises at least one zip tie.

14. The supporting device according to claim 1, wherein the positioning feature is positioned axially beyond a recess formed at an upper end of the connection element along a longitudinal dimension of the connection element.

15. The supporting device according to claim 1, wherein the stand feature comprises at least one plate or flange extension extending downwardly from a bottom surface of the connection element.

16. The supporting device according to claim 1, wherein the furrow device comprises a seed follower.

17. The supporting device according to claim 16, wherein the seed follower includes a connection portion for connecting the seed follower to the supporting device and an engaging portion for controlling seed placement in a furrow.

18. The supporting device according to claim 17, wherein the engaging portion of the seed follower comprises a width dimension greater than a width dimension of the connection portion of the seed follower.

19. A furrow device assembly, comprising:
   a furrow device; and
   a supporting device for operably connecting the furrow device to a seed tube of a planting unit, the supporting device comprising
   a connection element and an alignment element joined to the connection element, the connection element including a connection feature configured to attach the furrow device to the supporting device and a stand feature having a first stand proximal to a lower egress end of the seed tube and a second stand distal to the lower egress end of the seed tube with each of the first and second stands having a different length such that the stand feature positions the furrow device at a desired angle relative to the seed tube or furrow, and the alignment element including an alignment feature configured to axially align a longitudinal axis of the supporting device with a longitudinal axis of the seed tube and a positioning feature to position the furrow device at a desired location along a longitudinal dimension of the seed tube,
   wherein the alignment feature of the alignment element comprises a pair of side walls, portions of the side walls and the connection element define a first bracket for receiving a portion of the furrow device therein, and portions of the side walls and the connection element define a second bracket for placing over a portion of a seed tube.

20. The furrow device assembly according to claim 19, wherein the furrow device comprises a plurality of apertures, the connection feature of the supporting device comprises one or more apertures, at least one of the one or more apertures of the connection feature selectively align with at least one of the plurality of apertures of the furrow device for receiving at least one fastener for attaching the furrow device to the supporting device.

21. The furrow device assembly according to claim 19, the second bracket is placed over a seed sensor assembly attached to the seed tube.

22. The furrow device assembly according to claim 19, wherein the furrow device comprises a seed follower.

* * * * *